United States Patent
Wang et al.

(10) Patent No.: US 12,174,760 B2
(45) Date of Patent: Dec. 24, 2024

(54) KERNEL MAPPING TO NODES IN COMPUTE FABRIC

(71) Applicant: Micron Technology, Inc., Boise, ID (US)

(72) Inventors: Gongyu Wang, Wellesley, MA (US); Jason Eckhardt, Austin, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/211,473

(22) Filed: Jun. 19, 2023

(65) Prior Publication Data

US 2023/0333997 A1   Oct. 19, 2023

Related U.S. Application Data

(62) Division of application No. 17/407,486, filed on Aug. 20, 2021, now Pat. No. 11,860,800.

(51) Int. Cl.
  *G06F 13/16* (2006.01)
  *G06F 13/40* (2006.01)
  *G06F 15/78* (2006.01)
  *G06N 7/01* (2023.01)

(52) U.S. Cl.
  CPC ........ *G06F 13/1668* (2013.01); *G06F 13/161* (2013.01); *G06F 13/4022* (2013.01); *G06F 15/7825* (2013.01); *G06N 7/01* (2023.01)

(58) Field of Classification Search
  CPC ... G06F 13/668; G06F 13/161; G06F 15/7825
  See application file for complete search history.

(56) References Cited

U.S. PATENT DOCUMENTS

| | | | |
|---|---|---|---|
| 7,472,234 B2 | 12/2008 | Landry |
| 8,122,229 B2 | 2/2012 | Wallach et al. |
| 8,156,307 B2 | 4/2012 | Wallach et al. |
| 8,205,066 B2 | 6/2012 | Brewer et al. |
| 8,423,745 B1 | 4/2013 | Brewer |
| 8,561,037 B2 | 10/2013 | Brewer et al. |

(Continued)

FOREIGN PATENT DOCUMENTS

| | | |
|---|---|---|
| WO | WO-2010051167 A1 | 5/2010 |
| WO | WO-2013184380 A2 | 12/2013 |

(Continued)

OTHER PUBLICATIONS

"International Application Serial No. PCT/US2022/039849, International Search Report mailed Nov. 18, 2022", 3 pgs.

(Continued)

*Primary Examiner* — David E Martinez
(74) *Attorney, Agent, or Firm* — Schwegman Lundberg & Woessner, P.A.

(57) ABSTRACT

A reconfigurable compute fabric can include multiple nodes, and each node can include multiple tiles with respective processing and storage elements. Compute kernels can be parsed into directed graphs and mapped to particular node or tile resources for execution. In an example, a branch-and-bound search algorithm can be used to perform the mapping. The algorithm can use a cost function to evaluate the resources based on capability, occupancy, or power consumption of the various node or tile resources.

12 Claims, 15 Drawing Sheets

(56) References Cited

U.S. PATENT DOCUMENTS

| | | |
|---|---|---|
| 9,710,384 B2 | 7/2017 | Wallach et al. |
| 10,990,391 B2 | 4/2021 | Brewer |
| 10,990,392 B2 | 4/2021 | Brewer |
| 2008/0270708 A1 | 10/2008 | Warner et al. |
| 2012/0079177 A1 | 3/2012 | Brewer et al. |
| 2013/0332711 A1 | 12/2013 | Leidel et al. |
| 2015/0143350 A1 | 5/2015 | Brewer |
| 2015/0206561 A1 | 7/2015 | Brewer et al. |
| 2017/0177410 A1 | 6/2017 | Laroche et al. |
| 2018/0046440 A1 | 2/2018 | Josopait |
| 2019/0042214 A1 | 2/2019 | Brewer |
| 2019/0171604 A1 | 6/2019 | Brewer |
| 2019/0243700 A1 | 8/2019 | Brewer |
| 2019/0303154 A1* | 10/2019 | Brewer .............. G06F 9/30058 |
| 2019/0324928 A1 | 10/2019 | Brewer |
| 2019/0340019 A1 | 11/2019 | Brewer |
| 2019/0340020 A1 | 11/2019 | Brewer |
| 2019/0340023 A1 | 11/2019 | Brewer |
| 2019/0340024 A1 | 11/2019 | Brewer |
| 2019/0340027 A1 | 11/2019 | Brewer |
| 2019/0340035 A1 | 11/2019 | Brewer |
| 2019/0340154 A1 | 11/2019 | Brewer |
| 2019/0340155 A1 | 11/2019 | Brewer |
| 2021/0011645 A1 | 1/2021 | Martinelli et al. |
| 2021/0055964 A1 | 2/2021 | Brewer |
| 2021/0064374 A1 | 3/2021 | Brewer |
| 2021/0064435 A1 | 3/2021 | Brewer |
| 2021/0149600 A1 | 5/2021 | Brewer |
| 2023/0024035 A1* | 1/2023 | Thuerck .............. G06F 15/8046 |
| 2023/0059948 A1 | 2/2023 | Wang et al. |

FOREIGN PATENT DOCUMENTS

| | | |
|---|---|---|
| WO | WO-2019191740 A1 | 10/2019 |
| WO | WO-2019191742 A1 | 10/2019 |
| WO | WO-2019191744 A1 | 10/2019 |
| WO | WO-2019217287 A1 | 11/2019 |
| WO | WO-2019217295 A1 | 11/2019 |
| WO | WO-2019217324 A1 | 11/2019 |
| WO | WO-2019217326 A1 | 11/2019 |
| WO | WO-2019217329 A1 | 11/2019 |
| WO | WO-2019089816 A3 | 4/2020 |
| WO | WO-2023022902 A1 | 2/2023 |

OTHER PUBLICATIONS

"International Application Serial No. PCT/US2022/039849, Written Opinion mailed Nov. 18, 2022", 4 pgs.

* cited by examiner

KERNEL MAPPING TO NODES IN COMPUTE FABRIC

PRIORITY APPLICATION

This application is a divisional of U.S. application Ser. No. 17/407,486, filed Aug. 20, 2021, which is incorporated herein by reference in its entirety.

BACKGROUND

Various computer architectures, such as the Von Neumann architecture, conventionally use a shared memory for data, a bus for accessing the shared memory, an arithmetic unit, and a program control unit. However, moving data between processors and memory can require significant time and energy, which in turn can constrain performance and capacity of computer systems. In view of these limitations, new computing architectures and devices are desired to advance computing performance beyond the practice of transistor scaling (i.e., Moore's Law).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
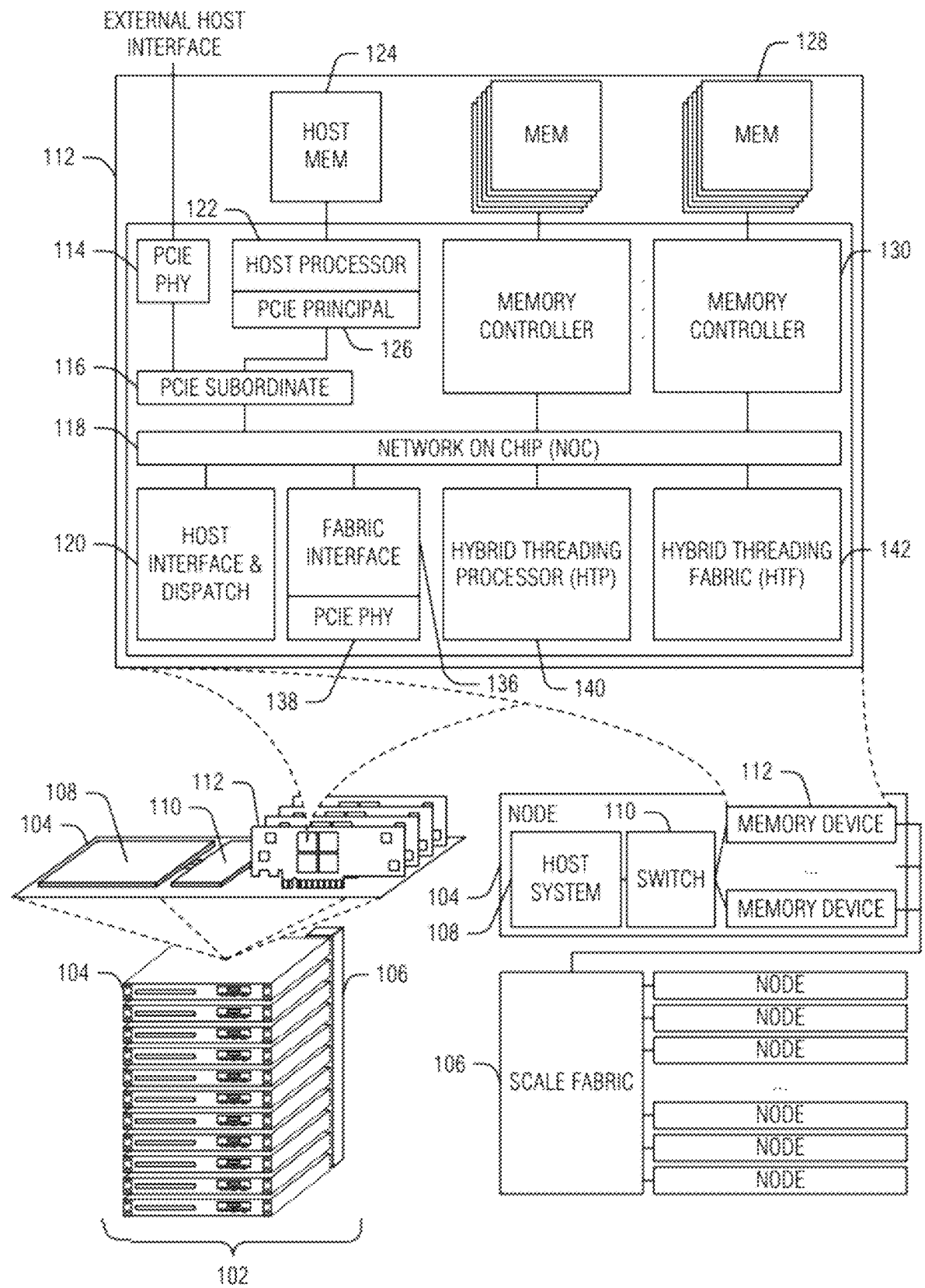
FIG. 1 illustrates generally a first example of a first memory-compute device in the context of a memory-compute system, according to an embodiment.

Recent advances in materials, devices, and integration technology, can be leveraged to provide memory-centric compute topologies. Such topologies can realize advances in compute efficiency and workload throughput, for example, for applications constrained by size, weight, or power requirements. The topologies can be used to facilitate low-latency compute near, or inside of, memory or other data storage elements. The approaches can be particularly well-suited for various compute-intensive operations with sparse lookups, such as in transform computations (e.g., fast Fourier transform computations (FFT)), or in applications such as neural networks or artificial intelligence (AI), financial analytics, or simulations or modeling such as for computational fluid dynamics (CFD), Enhanced Acoustic Simulator for Engineers (EASE), Simulation Program with Integrated Circuit Emphasis (SPICE), and others.

Systems, devices, and methods discussed herein can include or use memory-compute systems with processors, or processing capabilities, that are provided in, near, or integrated with memory or data storage components. Such systems are referred to generally herein as compute-near-memory (CNM) systems. A CNM system can be a node-based system with individual nodes in the systems coupled using a system scale fabric. Each node can include or use specialized or general purpose processors, and user-accessible accelerators, with a custom compute fabric to facilitate intensive operations, particularly in environments where high cache miss rates are expected.

In an example, each node in a CNM system can have a host processor or processors. Within each node, a dedicated hybrid threading processor can occupy a discrete endpoint of an on-chip network. The hybrid threading processor can have access to some or all of the memory in a particular node of the system, or a hybrid threading processor can have access to memories across a network of multiple nodes via the system scale fabric. The custom compute fabric, or hybrid threading fabric (HTF), at each node can have its own processor(s) or accelerator(s) or memory(ies) and can operate at higher bandwidth than the hybrid threading processor. Different nodes in a compute-near-memory system can be differently configured, such as having different compute capabilities, different types of memories, different interfaces, or other differences. However, the nodes can be commonly coupled to share data and compute resources within a defined address space.

In an example, a compute-near-memory system, or a node within the system, can be user-configured for custom operations. A user can provide instructions using a high-level programming language, such as C/C++, that can be compiled and mapped directly into a dataflow architecture of the system, or of one or more nodes in the CNM system. That is, the nodes in the system can include hardware blocks (e.g., memory controllers, atomic units, other customer accelerators, etc.) that can be configured to directly implement or support user instructions to thereby enhance system performance and reduce latency.

In an example, a compute-near-memory system can be particularly suited for implementing a hierarchy of instructions and nested loops (e.g., two, three, or more, loops deep, or multiple-dimensional loops) or other parallel or concurrent instructions. A standard compiler can be used to accept high-level language instructions and, in turn, compile directly into the dataflow architecture of one or more of the nodes. For example, a node in the system can include the HTF. The HTF can execute in a user space of the CNM system and can initiate its own threads or sub-threads, which can operate in parallel. Each thread can map to a different loop iteration to thereby support multi-dimensional loops. With the capability to initiate such nested loops, among other capabilities, the CNM system can realize significant time savings and latency improvements for compute-intensive operations.

The present inventors have recognized, among other things, that a problem to be solved can include compiling compute kernels for execution using a reconfigurable compute architecture. The inventors have further recognized that the problem can include optimizing resource usage and reducing latency throughout the compute architecture during execution of one or multiple threads. In an example, a solution to these and other problems can include or use the HTF of the CNM system to execute various compute kernels. The solution can further include mapping kernel operations to HTF resources based on a cost function that can be evaluated for different operation and resource pairs.

In an example, user instructions or programs can define compute kernels for execution using the CNM system. The compute kernels can be parsed and reconstructed in the form of a graph, such as a directed acyclic graph (DAG). The compute resources of the CNM system, such as comprising portions of the HTF, can be represented as a resource graph. Techniques discussed herein can include or use a search algorithm to map the kernel graph or DAG to the resource graph. The search algorithm can include, for example, a branch-and-bound algorithm that evaluates and selects resources based on a cost function that is evaluated for each different pair of particular kernel operations and resources. The cost function can consider, for example, capability, capacity, utilization, latency, power consumption, or other factors, for each resource under consideration for performing a particular portion of the kernel.

In an example, a hardware structure of the HTF discussed herein can facilitate compilation of complicated compute kernels, such as including kernels with nested loops. For example, tiles comprising the HTF can be connected using a reconfigurable compute fabric that helps reduce or remove constraints as to which tile-based compute resource, among the multiple available resources, is selected for particular operations in a data flow. Accordingly, the HTF structure itself can help provide flexibility to the compiler. For example, each tile includes synchronous fabric inputs and outputs, asynchronous fabric inputs and outputs, and one or more passthrough channels for low latency communication among tiles in a node. Data flows can thus be mapped to resources on neighboring or non-neighboring tiles using a combination of the different inputs, outputs, and passthrough channels of multiple tiles. In other words, due at least in part to the different communication paths between and among tiles in the HTF, a greater number of low latency paths can be established to realize flows than would be available using other arrays of compute resources without such paths. Since a relatively greater number of flows can be available, such flows can be further optimized by balancing other system-level interests such as resource utilization, performance, and power consumption.

Figure 6A:
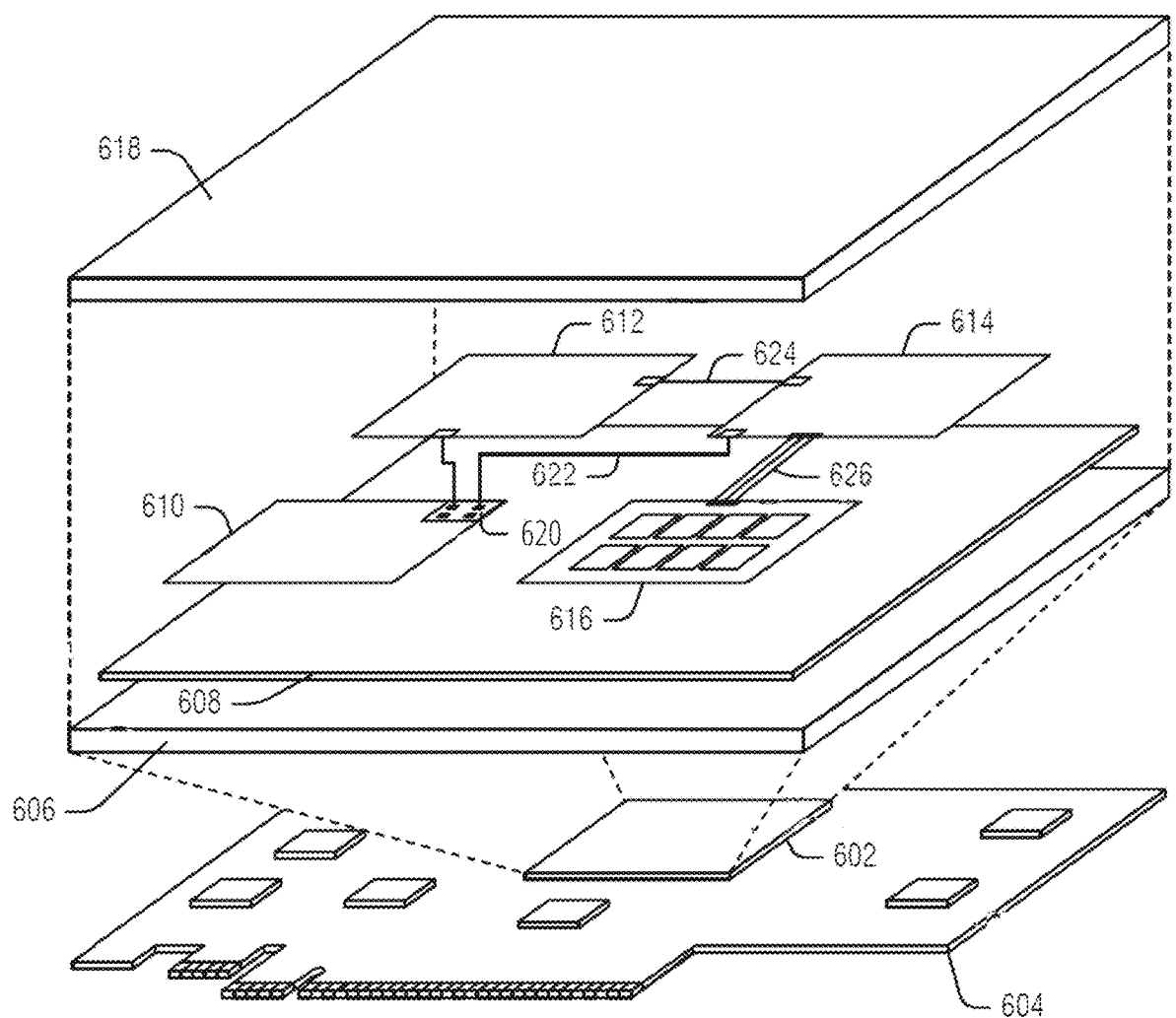
FIG. 6A illustrates generally an example of a chiplet system, according to an embodiment.
Figure 6B:
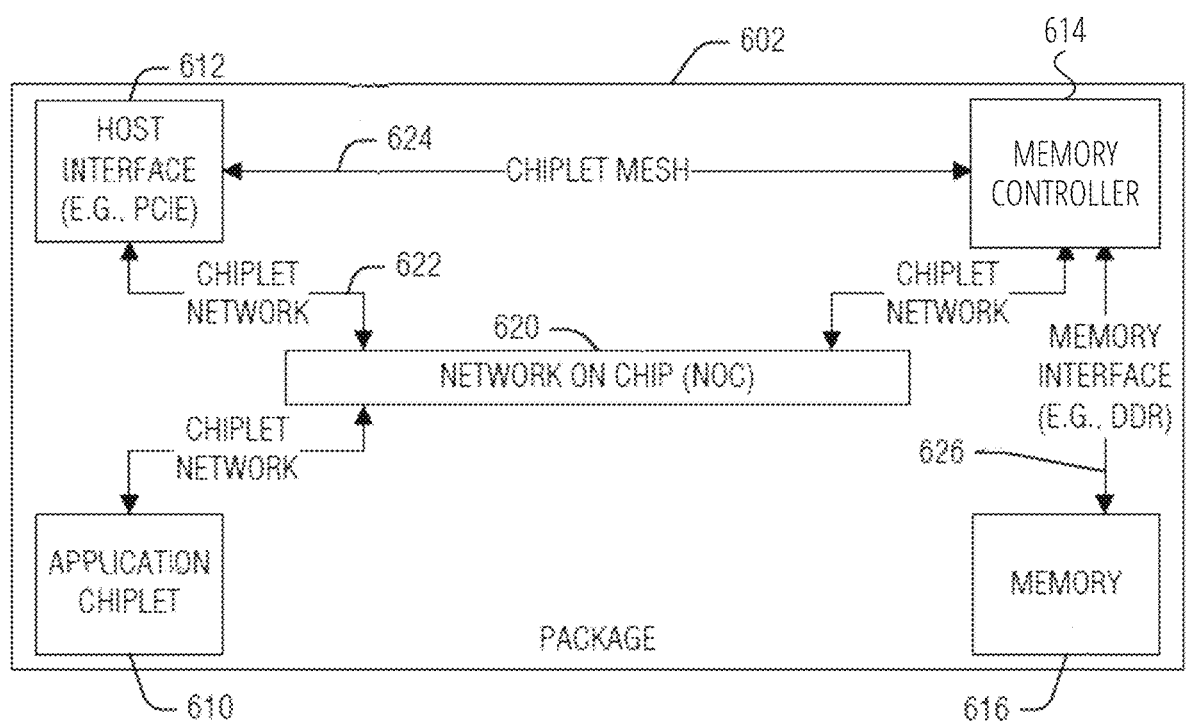
FIG. 6B illustrates generally a block diagram showing various components in the chiplet system from the example of FIG. 6A.

A compute-near-memory system, or nodes or tiles of a compute-near-memory system, can include or use various memory devices, controllers, and interconnects, among other things. In an example, the system can comprise various interconnected nodes and the nodes, or groups of nodes, can be implemented using chiplets. Chiplets are an emerging technique for integrating various processing functionality. Generally, a chiplet system is made up of discrete chips (e.g., integrated circuits (ICs) on different substrate or die) that are integrated on an interposer and packaged together. This arrangement is distinct from single chips (e.g., ICs) that contain distinct device blocks (e.g., intellectual property (IP) blocks) on one substrate (e.g., single die), such as a system-on-a-chip (SoC), or discretely packaged devices integrated on a board. In general, chiplets provide production benefits than single die chips, including higher yields or reduced development costs. FIG. 6A and FIG. 6B, discussed below, illustrate generally an example of a chiplet system such as can comprise a compute-near-memory system.

In some examples, a compute-near-memory system is programmed to arrange components of a reconfigurable compute fabric, such as the hybrid threading fabric (HTF) described herein, into one or more synchronous flows. The reconfigurable compute fabric comprises one or more hardware flow controllers and one or more hardware compute elements that can be arranged to form one or more synchronous flows, as described herein.

A compute element comprises a compute element memory and a processor or other suitable logic circuitry forming a compute pipeline for processing received data. In some examples, a compute element comprises multiple parallel processing lanes, such as single instruction multiple data (SIMD) processing lanes. A compute element can further comprise circuitry for sending and receiving synchronous and asynchronous messages to flow controllers, other compute elements, and other system components, as described herein. Example compute elements are described herein with respect to HTF tiles, such as the tiles 504, 510, 512 of FIG. 5, among others.

A flow controller can include a processor or other logic circuitry for managing a synchronous flow, as described herein. The flow controller comprises circuitry for sending synchronous and asynchronous messages to compute elements, other flow controllers, and other system components, as described herein. In some examples, a flow controller is implemented using a tile base of one or more of the HTF tiles 504, 510, 512 described herein.

A synchronous flow can include hardware arranged in a reconfigurable compute fabric that comprises a hardware flow controller and an ordered synchronous data path comprising one or more hardware compute elements. A synchronous flow can execute one or more threads of work. To execute a thread, the hardware components of the synchronous flow pass synchronous messages and execute a predetermined set of operations in the order of the synchronous flow.

The present inventors have recognized, among other things, that a problem to be solved can include avoiding latency in threads or compiled HTF compute kernels, such as can result from occupied or blocked routing paths in a flow. A solution to the problem can include or use one or more delay registers at each tile in the fabric. In an example, the solution includes pipelined delay and output registers wherein the delay registers are physical replicas of each corresponding output register. The delay registers can provide a buffering location for compute results, such as can be stored for one or more clock cycles before further processing or before output to another tile or fabric location. Such buffering by the delay register or registers can help free up the corresponding connected output register, through which new or other results can be routed, thereby enhancing throughput for each tile in the HTF.

In an example, a thread is completed when all of the compute elements of the synchronous flow complete their programmed operations in the predetermined order of the synchronous flow. When a thread is completed, a pipeline of synchronous messages will have propagated between the various compute elements in the predetermined order of the synchronous flow, beginning at the flow controller. Because the arrangement is synchronous, the completion of a thread may occur in a fixed amount of time (e.g., a predictable number of clock cycles from when the flow controller initiates the synchronous flow).

Arrangements of HTF to include synchronous flows may facilitate parallel processing. For example, a flow controller for a synchronous flow need not wait for one thread to complete before initiating an additional thread. Consider an example synchronous flow including a flow controller and multiple compute elements. The flow controller initiates a first thread by providing a synchronous message to the first compute element of the synchronous flow. The first compute element can perform its processing and direct a second synchronous message to the next compute element, and so on. After the first compute element completes its processing and directs the synchronous message to the next compute element, the flow controller can initiate an additional thread at the synchronous flow, for example, by providing an additional synchronous message to the first compute element. The dedicated delay and output registers can help coordinate timing of one or more components of the same flow or of parallel flows.

Parallelization of synchronous flows at a reconfigurable compute fabric can use compute elements that operate at a predefined cadence or Spoke Count, such as using the various tiles described herein. For example, a compute element may use a predetermined number of clock cycles to perform various operations, such as receiving synchronous messages, performing processing operations, sending synchronous messages, etc. The compute element can be configured to receive a new synchronous message and begin operations for a thread while operations from a previous thread are still propagating through a different compute element. The new thread can be a different thread of the same synchronous flow of the previous thread or can be a thread of a different synchronous flow.

A synchronous flow can use an asynchronous fabric of the reconfigurable compute fabric to communicate with other synchronous flows and/or other components of the reconfigurable compute fabric using asynchronous messages. For example, a flow controller may receive an asynchronous message from a dispatch interface and/or from another flow controller instructing the flow controller to begin a thread at or using a synchronous flow. The dispatch interface may interface between the reconfigurable compute fabric and other system components. Also, in some examples, a synchronous flow may send an asynchronous message to the dispatch interface to indicate completion of a thread.

Asynchronous messages can be used by synchronous flows to access memory. For example, the reconfigurable compute fabric can include one or more memory interfaces. Memory interfaces are hardware components that can be used by a synchronous flow or components thereof to access an external memory that is not part of the synchronous flow. A thread executed at a synchronous flow can include sending a read and/or write request to a memory interface. Because reads and writes are asynchronous, the thread that initiates a read or write request to the memory interface may not receive the results of the request. Instead, the results of a read or write request can be provided to a different thread executed at a different synchronous flow. Delay and output registers in one or more of the tiles can help coordinate and maximize efficiency of a first flow, for example, by precisely timing engagement of particular compute resources of one tile with arrival of data relevant to the first flow. The registers can help enable the particular compute resources of the same tile to be repurposed for flows other than the first flow, for example while the first flow dwells or waits for other data or operations to complete. Such other data or operations can depend on one or more other resources on the fabric.

In an example, a reconfigurable compute fabric can use a first synchronous flow for initiating a read request and a second synchronous flow for receiving the results of the read request. A first thread at the first synchronous flow can send an asynchronous read request message to a memory interface. The first thread can also send an asynchronous continue-type message to the flow controller of the second synchronous flow, where the continue message indicates the read request. The memory interface acquires the requested data from the memory and directs the read data to an appropriate compute element of the second synchronous flow. The compute element then directs an asynchronous message to the second flow controller indicating that the data has been received. In some examples, the memory interface provides the read data directly to the second flow controller. After receiving an indication that the read data has been received, the second flow controller initiates a thread at the second synchronous flow to further process the result of the read request.

In some examples, a reconfigurable compute fabric, such as the HTF described herein, is used to execute one or more loops, such as a set of nested loops. To execute a loop, the reconfigurable compute fabric can use flow controllers and compute elements arranged into one or more synchronous flows, as described herein. For example, the flow controller for a synchronous flow can initiate a thread at the synchronous flow for each iteration of a loop. Consider the simple example loop given by code segment [1] below:

```
[1]:
for i=1, 10 {
x[i]=x[i-1]*2;
saveMem = x[i];
}
```

A flow controller may begin the example loop by initiating a first thread at the synchronous flow for an i=1 loop iteration. In this example, an initial value for x[i−1] is passed by the flow controller to the first compute element with the payload data of the initial synchronous message. The compute element or elements of the synchronous flow determines a value for x[1] and returns the value for x[1] to the flow controller as a synchronous or asynchronous message. The flow controller then initiates a second thread at the synchronous flow for the i=2 loop iteration, passing the returned value of x[1] as x[i−1] in a synchronous message. This process continues until all iterations of the loop are completed and a value for x[10] is returned.

The example loop above uses a single synchronous flow for each iteration of the loop. In some examples, however, multiple synchronous flows can be used for each loop iteration. Consider the example loop given by code segment [2] below:

```
[2]:
for i=1, 10 {
  x[i]=i*y[i];
  saveMem = x[i];
}
```

In this example, each loop iteration involves multiplying i by a value y[i] read from memory, and then writing the result to memory. Accordingly, each loop iteration includes an asynchronous memory read and an asynchronous memory write. As described herein, the memory read involves sending an asynchronous message to a memory interface and then waiting for the memory interface to reply with another asynchronous message including the requested data. Because the memory read is asynchronous, each loop iteration may use synchronous flow threads executing at two different synchronous flows. For the i=1 loop iteration, a thread at a first synchronous flow sends an asynchronous message to the memory interface including a read request for the value of y[1]. The thread at the first synchronous flow may also send an asynchronous message to a second flow controller of the second synchronous flow instructing the second flow controller to expect the result of the read request (either directly from the memory interface or from a compute element of the second synchronous flow that has received the read data). The memory interface initiates a read of the value of y[1] and provides the value of y[1] to the second synchronous flow via an asynchronous message. Upon receiving an asynchronous message indicating that the read data is received, the second flow controller initiates a thread at the second synchronous flow. (The returned value of y[1] can be provided to the compute elements, for example, via synchronous communications of the thread and/or directly from the memory interface prior to initiation of the thread.) The second thread determines the value of x[1] and sends a synchronous message to the memory interface including a write request for x[1].

In some examples, the number of threads that a synchronous flow controller can initiate at a synchronous flow is limited by the resources of the components of the synchronous flow. For example, threads of a synchronous flow may write data to the various local compute element memories at the synchronous flow compute elements. If too many synchronous flow threads are initiated at the same time, some synchronous flow threads may lack sufficient local memory or other resources. This may prevent a synchronous flow thread from writing its data and/or cause it to overwrite the locally-stored data of other synchronous flow threads.

To prevent this, a reconfigurable compute fabric may limit the number of synchronous flow threads that can be initiated at a given time. For example, the reconfigurable compute fabric may implement a pool of thread identifiers (IDs). A flow controller may determine that a thread ID is available before implementing a synchronous flow thread. In some examples, the synchronous messages of a synchronous flow thread may include an indication of the thread ID for a given thread.

When a synchronous flow thread is complete, it may send an asynchronous free message, for example, to the flow controller that initiated the synchronous flow thread. This indicates to the flow controller that the thread ID (and associated resources) for the completed synchronous flow thread are now available for use by a new synchronous flow thread.

When a synchronous flow is used to execute a loop, the synchronous flow threads executing different iterations of the loop may have need to read data from and/or write data to memory. For example, during execution of a synchronous flow thread, one or more compute elements may read operand data specific to the current loop iteration from compute element memory. Similarly, one or more compute elements may write result data specific to the current loop iteration to compute element, or tile-specific, memory. Further, in some examples, during execution of a synchronous flow thread, a compute element may make loop-iteration specific reads from or writes to external memory via a memory interface. These read, write, compute, or other operations can create timing issues that can reduce system efficiency and resource usage. For example, compute resources may be unused or underused during various clock cycles when data is moved through the same or other compute element in a system. In an example, the system can include or use compute element delay registers with a loop-back or feedback path to help coordinate flow threads and increase resource usage, such as by avoiding output register blocking or avoiding extraneous read or write operations to temporary storage locations.

FIG. 1 illustrates generally a first example of a compute-near-memory system, or CNM system 102. The example of the CNM system 102 includes multiple different memory-compute nodes, such as can each include various compute-near-memory devices. Each node in the system can operate in its own operating system (OS) domain (e.g., Linux, among others). In an example, the nodes can exist collectively in a common OS domain of the CNM system 102.

The example of FIG. 1 includes an example of a first memory-compute node 104 of the CNM system 102. The CNM system 102 can have multiple nodes, such as including different instances of the first memory-compute node 104, that are coupled using a scale fabric 106. In an example, the architecture of the CNM system 102 can support scaling with up to n different memory-compute nodes (e.g., n=4096) using the scale fabric 106. As further discussed below, each node in the CNM system 102 can be an assembly of multiple devices.

The CNM system 102 can include a global controller for the various nodes in the system, or a particular memory-compute node in the system can optionally serve as a host or controller to one or multiple other memory-compute nodes in the same system. The various nodes in the CNM system 102 can thus be similarly or differently configured.

In an example, each node in the CNM system 102 can comprise a host system that uses a specified operating system. The operating system can be common or different among the various nodes in the CNM system 102. In the example of FIG. 1, the first memory-compute node 104 comprises a host system 108, a first switch 110, and a first memory-compute device 112. The host system 108 can comprise a processor, such as can include an X86, ARM, RISC-V, or other type of processor. The first switch 110 can be configured to facilitate communication between or among devices of the first memory-compute node 104 or of the CNM system 102, such as using a specialized or other communication protocol, generally referred to herein as a chip-to-chip protocol interface (CTCPI). That is, the CTCPI can include a specialized interface that is unique to the CNM system 102, or can include or use other interfaces such as the compute express link (CXL) interface, the peripheral component interconnect express (PCIe) interface, or the chiplet protocol interface (CPI), among others. The first switch 110 can include a switch configured to use the CTCPI. For example, the first switch 110 can include a CXL switch, a PCIe switch, a CPI switch, or other type of switch. In an example, the first switch 110 can be configured to couple differently configured endpoints. For example, the first switch 110 can be configured to convert packet formats, such as between PCIe and CPI formats, among others.

The CNM system 102 is described herein in various example configurations, such as comprising a system of nodes, and each node can comprise various chips (e.g., a processor, a switch, a memory device, etc.). In an example, the first memory-compute node 104 in the CNM system 102 can include various chips implemented using chiplets. In the below-discussed chiplet-based configuration of the CNM system 102, inter-chiplet communications, as well as additional communications within the system, can use a CPI network. The CPI network described herein is an example of the CTCPI, that is, as a chiplet-specific implementation of the CTCPI. As a result, the below-described structure, operations, and functionality of CPI can apply equally to structures, operations, and functions as may be otherwise implemented using non-chiplet-based CTCPI implementations. Unless expressly indicated otherwise, any discussion herein of CPI applies equally to CTCPI.

A CPI interface includes a packet-based network that supports virtual channels to enable a flexible and high-speed interaction between chiplets, such as can comprise portions of the first memory-compute node 104 or the CNM system 102. The CPI can enable bridging from intra-chiplet networks to a broader chiplet network. For example, the Advanced eXtensible Interface (AXI) is a specification for intra-chip communications. AXI specifications, however, cover a variety of physical design options, such as the number of physical channels, signal timing, power, etc. Within a single chip, these options are generally selected to meet design goals, such as power consumption, speed, etc. However, to achieve the flexibility of a chiplet-based memory-compute system, an adapter, such as using CPI, can interface between the various AXI design options that can be implemented in the various chiplets. By enabling a physical channel-to-virtual channel mapping and encapsulating time-based signaling with a packetized protocol, CPI can be used to bridge intra-chiplet networks, such as within a particular memory-compute node, across a broader chiplet network, such as across the first memory-compute node 104 or across the CNM system 102.

The CNM system 102 is scalable to include multiple-node configurations. That is, multiple different instances of the first memory-compute node 104, or of other differently configured memory-compute nodes, can be coupled using the scale fabric 106, to provide a scaled system. Each of the memory-compute nodes can run its own operating system and can be configured to jointly coordinate system-wide resource usage.

In the example of FIG. 1, the first switch 110 of the first memory-compute node 104 is coupled to the scale fabric 106. The scale fabric 106 can provide a switch (e.g., a CTCPI switch, a PCIe switch, a CPI switch, or other switch) that can facilitate communication among and between different memory-compute nodes. In an example, the scale fabric 106 can help various nodes communicate in a partitioned global address space (PGAS).

In an example, the first switch 110 from the first memory-compute node 104 is coupled to one or multiple different memory-compute devices, such as including the first memory-compute device 112. The first memory-compute device 112 can comprise a chiplet-based architecture referred to herein as a compute-near-memory (CNM) chiplet. A packaged version of the first memory-compute device 112 can include, for example, one or multiple CNM chiplets. The chiplets can be communicatively coupled using CTCPI for high bandwidth and low latency.

In the example of FIG. 1, the first memory-compute device 112 can include a network on chip (NOC) or first NOC 118. Generally, a NOC is an interconnection network within a device, connecting a particular set of endpoints. In FIG. 1, the first NOC 118 can provide communications and connectivity between the various memory, compute resources, and ports of the first memory-compute device 112.

In an example, the first NOC 118 can comprise a folded Clos topology, such as within each instance of a memory-compute device, or as a mesh that couples multiple memory-compute devices in a node. The Clos topology, such as can use multiple, smaller radix crossbars to provide functionality associated with a higher radix crossbar topology, offers various benefits. For example, the Clos topology can exhibit consistent latency and bisection bandwidth across the NOC.

The first NOC 118 can include various distinct switch types including hub switches, edge switches, and endpoint switches. Each of the switches can be constructed as crossbars that provide substantially uniform latency and bandwidth between input and output nodes. In an example, the endpoint switches and the edge switches can include two separate crossbars, one for traffic headed to the hub switches, and the other for traffic headed away from the hub switches. The hub switches can be constructed as a single crossbar that switches all inputs to all outputs.

In an example, the hub switches can have multiple ports each (e.g., four or six ports each), such as depending on whether the particular hub switch participates in inter-chip communications. A number of hub switches that participates in inter-chip communications can be set by an inter-chip bandwidth requirement.

The first NOC 118 can support various payloads (e.g., from 8 to 64-byte payloads; other payload sizes can similarly be used) between compute elements and memory. In an example, the first NOC 118 can be optimized for relatively smaller payloads (e.g., 8-16 bytes) to efficiently handle access to sparse data structures.

In an example, the first NOC 118 can be coupled to an external host via a first physical-layer interface 114, a PCIe subordinate module 116 or endpoint, and a PCIe principal module 126 or root port. That is, the first physical-layer interface 114 can include an interface to allow an external host processor to be coupled to the first memory-compute device 112. An external host processor can optionally be coupled to one or multiple different memory-compute devices, such as using a PCIe switch or other, native protocol switch. Communication with the external host processor through a PCIe-based switch can limit device-to-device communication to that supported by the switch. Communication through a memory-compute device-native protocol switch such as using CTCPI, in contrast, can allow for more full communication between or among different memory-compute devices, including support for a partitioned global address space, such as for creating threads of work and sending events.

In an example, the CTCPI protocol can be used by the first NOC 118 in the first memory-compute device 112, and the first switch 110 can include a CTCPI switch. The CTCPI switch can allow CTCPI packets to be transferred from a source memory-compute device, such as the first memory-compute device 112, to a different, destination memory-compute device (e.g., on the same or other node), such as without being converted to another packet format.

In an example, the first memory-compute device 112 can include an internal host processor 122. The internal host processor 122 can be configured to communicate with the first NOC 118 or other components or modules of the first memory-compute device 112, for example, using the internal PCIe principal module 126, which can help eliminate a physical layer that would consume time and energy. In an example, the internal host processor 122 can be based on a RISC-V ISA processor, and can use the first physical-layer interface 114 to communicate outside of the first memory-compute device 112, such as to other storage, networking, or other peripherals to the first memory-compute device 112. The internal host processor 122 can control the first memory-compute device 112 and can act as a proxy for operating system-related functionality. The internal host processor 122 can include a relatively small number of processing cores (e.g., 2-4 cores) and a host memory device 124 (e.g., comprising a DRAM module).

In an example, the internal host processor 122 can include PCI root ports. When the internal host processor 122 is in use, then one of its root ports can be connected to the PCIe subordinate module 116. Another of the root ports of the internal host processor 122 can be connected to the first physical-layer interface 114, such as to provide communication with external PCI peripherals. When the internal host processor 122 is disabled, then the PCIe subordinate module 116 can be coupled to the first physical-layer interface 114 to allow an external host processor to communicate with the first NOC 118. In an example of a system with multiple memory-compute devices, the first memory-compute device 112 can be configured to act as a system host or controller. In this example, the internal host processor 122 can be in use, and other instances of internal host processors in the respective other memory-compute devices can be disabled.

The internal host processor 122 can be configured at power-up of the first memory-compute device 112, such as to allow the host to initialize. In an example, the internal host processor 122 and its associated data paths (e.g., including the first physical-layer interface 114, the PCIe subordinate module 116, etc.) can be configured from input pins to the first memory-compute device 112. One or more of the pins can be used to enable or disable the internal host processor 122 and configure the PCI (or other) data paths accordingly.

In an example, the first NOC 118 can be coupled to the scale fabric 106 via a scale fabric interface module 136 and a second physical-layer interface 138. The scale fabric interface module 136, or SIF, can facilitate communication between the first memory-compute device 112 and a device space, such as a partitioned global address space (PGAS). The PGAS can be configured such that a particular memory-compute device, such as the first memory-compute device 112, can access memory or other resources on a different memory-compute device (e.g., on the same or different node), such as using a load/store paradigm. Various scalable fabric technologies can be used, including CTCPI, CPI, Gen-Z, PCI, or Ethernet bridged over CXL. The scale fabric 106 can be configured to support various packet formats. In an example, the scale fabric 106 supports orderless packet communications, or supports ordered packets such as can use a path identifier to spread bandwidth across multiple equivalent paths. The scale fabric 106 can generally support remote operations such as remote memory read, write, and other built-in atomics, remote memory atomics, remote memory-compute device send events, and remote memory-compute device call and return operations.

In an example, the first NOC 118 can be coupled to one or multiple different memory modules, such as including a first memory device 128. The first memory device 128 can include various kinds of memory devices, for example, LPDDR5 or GDDR6, among others. In the example of FIG. 1, the first NOC 118 can coordinate communications with the first memory device 128 via a memory controller 130 that can be dedicated to the particular memory module. In an example, the memory controller 130 can include a memory module cache and an atomic operations module. The atomic operations module can be configured to provide relatively high-throughput atomic operators, such as including integer and floating-point operators. The atomic operations module can be configured to apply its operators to data within the memory module cache (e.g., comprising SRAM memory side cache), thereby allowing back-to-back atomic operations using the same memory location, with minimal throughput degradation.

The memory module cache can provide storage for frequently accessed memory locations, such as without having to re-access the first memory device 128. In an example, the memory module cache can be configured to cache data only for a particular instance of the memory controller 130. In an example, the memory controller 130 includes a DRAM controller configured to interface with the first memory device 128, such as including DRAM devices. The memory controller 130 can provide access scheduling and bit error management, among other functions.

In an example, the first NOC 118 can be coupled to a hybrid threading processor (HTP 140), a hybrid threading fabric (HTF 142) and a host interface and dispatch module (HIF 120). The HIF 120 can be configured to facilitate access to host-based command request queues and response queues. In an example, the HIF 120 can dispatch new threads of execution on processor or compute elements of the HTP 140 or the HTF 142. In an example, the HIF 120 can be configured to maintain workload balance across the HTP 140 module and the HTF 142 module.

The hybrid threading processor, or HTP 140, can include an accelerator, such as can be based on a RISC-V instruction set. The HTP 140 can include a highly threaded, event-driven processor in which threads can be executed in single instruction rotation, such as to maintain high instruction throughput. The HTP 140 comprises relatively few custom instructions to support low-overhead threading capabilities, event send/receive, and shared memory atomic operators.

The hybrid threading fabric, or HTF 142, can include an accelerator, such as can include a non-von Neumann, coarse-grained, reconfigurable processor. The HTF 142 can be optimized for high-level language operations and data types (e.g., integer or floating point). In an example, the HTF 142 can support data flow computing. The HTF 142 can be configured to use substantially all of the memory bandwidth available on the first memory-compute device 112, such as when executing memory-bound compute kernels.

The HTP and HTF accelerators of the CNM system 102 can be programmed using various high-level, structured programming languages. For example, the HTP and HTF accelerators can be programmed using C/C++, such as using the LLVM compiler framework. The HTP accelerator can leverage an open source compiler environment, such as with various added custom instruction sets configured to improve memory access efficiency, provide a message passing mechanism, and manage events, among other things. In an example, the HTF accelerator can be designed to enable programming of the HTF 142 using a high-level programming language, and the compiler can generate a simulator configuration file or a binary file that runs on the HTF 142 hardware. The HTF 142 can provide a mid-level language for expressing algorithms precisely and concisely, while hiding configuration details of the HTF accelerator itself. In an example, the HTF accelerator tool chain can use an LLVM front-end compiler and the LLVM intermediate representation (IR) to interface with an HTF accelerator back end.

In an example, the kernel mapping systems and methods discussed herein can leverage LLVM instruction selection (ISel) passes to realize HTF implementations. The solution can include using a virtualized instruction set architecture (ISA) of the HTF that can be described to ISel with standard LLVM mechanisms. For example, the solution can provide a subset of HTF instructions with virtual register operands, each of which looks like a standard RISC instruction. The ISA can further provide various virtual operations that can be lowered to HTF instructions in subsequent passes. For example, an HTF memory load can include operations such as a memory request followed by a memory response. Instead of attempting to describe this to ISel, a virtual RISC-like htf.load instruction can be lowered into a pair of operations before scheduling. In an example, the solution can further include or use a virtualized global register file for ISel. With such a virtualized HTF description, results from ISel can look like an HTF instruction stream, which allows for reuse of machine optimization passes of LLVM.

In an example, compute kernels can be parsed and reconstructed to form a DAG within the custom LLVM backend. The optimized ISA representation of the kernel can then be taken as an input and rewritten in terms of virtual HTF instructions using actual HTF instructions. The custom backend can further analyze data flow of the kernel, such as based on the input ISA representation, and then group any asynchronous instructions (e.g., htf.load and htf.store) based on data dependencies, and then partition the instructions into synchronous dataflows (SDFs), with each SDF hosting one group of asynchronous operations. A startup instructions (e.g., htf.startsync) can be inserted at the beginning of each SDF to initiate it. Various other instructions can be used such as to continue to a next or subsequent SDF (e.g., htf.cont), to start a new SDF loop (e.g., htf.loop), or to read from tile memory (e.g., htf.rdtm). Other instructions can be similarly provided to help translate basic kernel instructions into HTF instructions.

Figure 2:
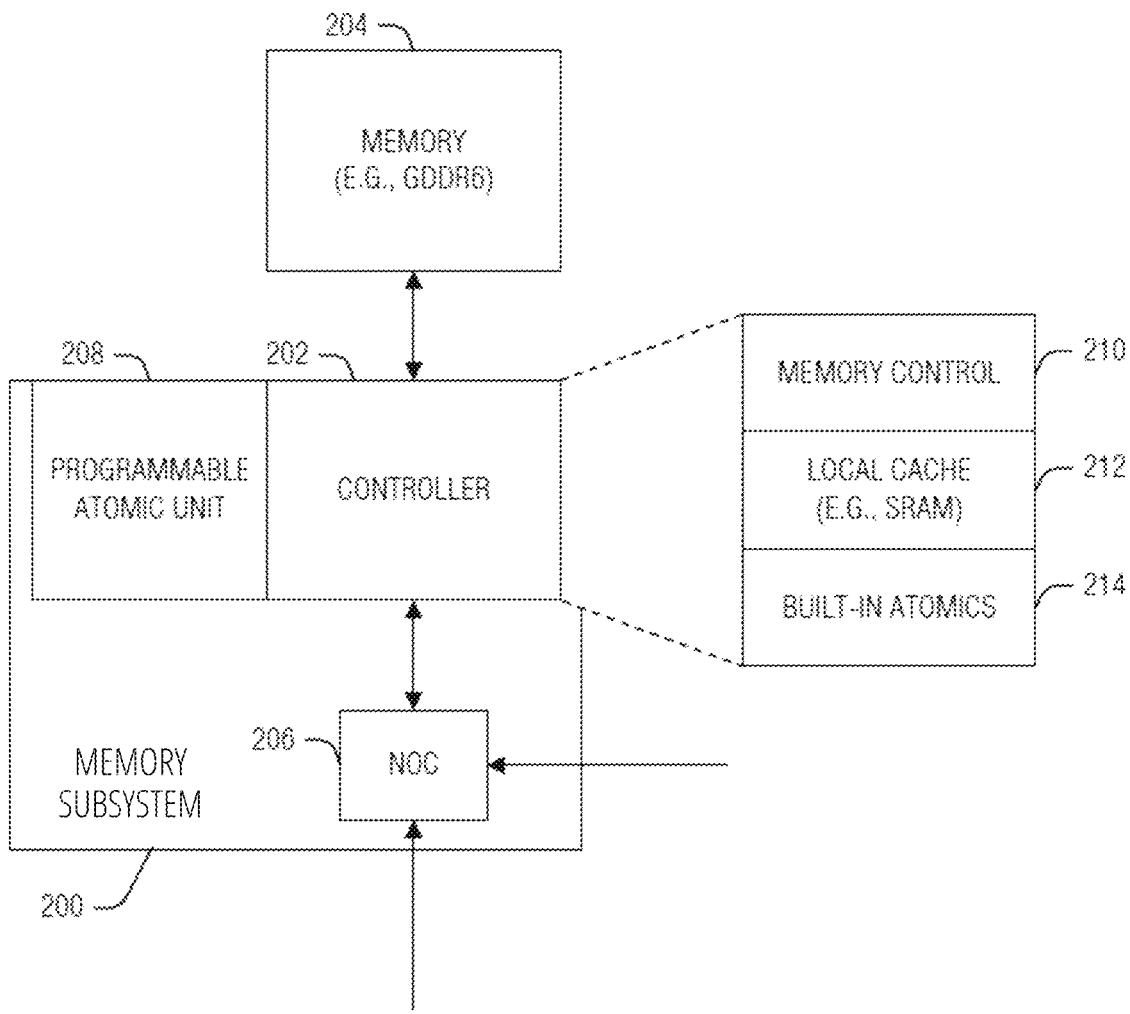
FIG. 2 illustrates generally an example of a memory subsystem of a memory-compute device, according to an embodiment.

FIG. 2 illustrates generally an example of a memory subsystem 200 of a memory-compute device, according to an embodiment. The example of the memory subsystem 200 includes a controller 202, a programmable atomic unit 208, and a second NOC 206. The controller 202 can include or use the programmable atomic unit 208 to carry out operations using information in a memory device 204. In an example, the memory subsystem 200 comprises a portion of the first memory-compute device 112 from the example of FIG. 1, such as including portions of the first NOC 118 or of the memory controller 130.

In the example of FIG. 2, the second NOC 206 is coupled to the controller 202 and the controller 202 can include a memory control module 210, a local cache module 212, and a built-in atomics module 214. In an example, the built-in atomics module 214 can be configured to handle relatively simple, single-cycle, integer atomics. The built-in atomics module 214 can perform atomics at the same throughput as, for example, normal memory read or write operations. In an example, an atomic memory operation can include a combination of storing data to the memory, performing an atomic memory operation, and then responding with load data from the memory.

The local cache module 212, such as can include an SRAM cache, can be provided to help reduce latency for repetitively-accessed memory locations. In an example, the local cache module 212 can provide a read buffer for sub-memory line accesses. The local cache module 212 can be particularly beneficial for compute elements that have relatively small or no data caches.

The memory control module 210, such as can include a DRAM controller, can provide low-level request buffering and scheduling, such as to provide efficient access to the memory device 204, such as can include a DRAM device. In an example, the memory device 204 can include or use a GDDR6 DRAM device, such as having 16 Gb density and 64 Gb/sec peak bandwidth. Other devices can similarly be used.

In an example, the programmable atomic unit 208 can comprise single-cycle or multiple-cycle operator such as can be configured to perform integer addition or more complicated multiple-instruction operations such as bloom filter insert. In an example, the programmable atomic unit 208 can be configured to perform load and store-to-memory operations. The programmable atomic unit 208 can be configured to leverage the RISC-V ISA with a set of specialized instructions to facilitate interactions with the controller 202 to atomically perform user-defined operations.

Programmable atomic requests, such as received from an on-node or off-node host, can be routed to the programmable atomic unit 208 via the second NOC 206 and the controller 202. In an example, custom atomic operations (e.g., carried out by the programmable atomic unit 208) can be identical to built-in atomic operations (e.g., carried out by the built-in atomics module 214) except that a programmable atomic operation can be defined or programmed by the user rather than the system architect. In an example, programmable atomic request packets can be sent through the second NOC 206 to the controller 202, and the controller 202 can identify the request as a custom atomic. The controller 202 can then forward the identified request to the programmable atomic unit 208.

Figure 3:
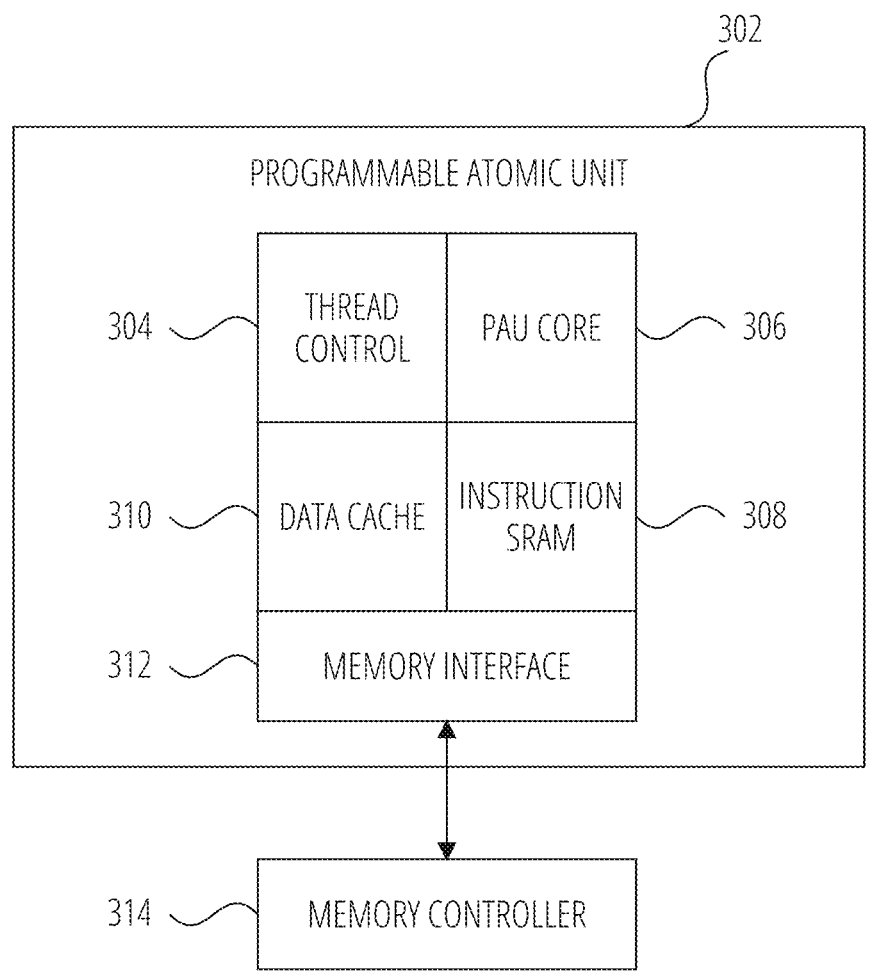
FIG. 3 illustrates generally an example of a programmable atomic unit for a memory controller, according to an embodiment.

FIG. 3 illustrates generally an example of a programmable atomic unit 302 for use with a memory controller, according to an embodiment. In an example, the programmable atomic unit 302 can comprise or correspond to the programmable atomic unit 208 from the example of FIG. 2. That is, FIG. 3 illustrates components in an example of a programmable atomic unit 302 (PAU), such as those noted above with respect to FIG. 2 (e.g., in the programmable atomic unit 208), or to FIG. 1 (e.g., in an atomic operations module of the memory controller 130). As illustrated in FIG. 3, the programmable atomic unit 302 includes a PAU processor or PAU core 306, a PAU thread control 304, an instruction SRAM 308, a data cache 310, and a memory interface 312 to interface with the memory controller 314. In an example, the memory controller 314 comprises an example of the controller 202 from the example of FIG. 2.

In an example, the PAU core 306 is a pipelined processor such that multiple stages of different instructions are executed together per clock cycle. The PAU core 306 can include a barrel-multithreaded processor, with thread control 304 circuitry to switch between different register files (e.g., sets of registers containing current processing state) upon each clock cycle. This enables efficient context switching between currently executing threads. In an example, the PAU core 306 supports eight threads, resulting in eight register files. In an example, some or all of the register files are not integrated into the PAU core 306, but rather reside in a local data cache 310 or the instruction SRAM 308. This reduces circuit complexity in the PAU core 306 by eliminating the traditional flip-flops used for registers in such memories.

The local PAU memory can include instruction SRAM 308, such as can include instructions for various atomics. The instructions comprise sets of instructions to support various application-loaded atomic operators. When an atomic operator is requested, such as by an application chiplet, a set of instructions corresponding to the atomic operator are executed by the PAU core 306. In an example, the instruction SRAM 308 can be partitioned to establish the sets of instructions. In this example, the specific programmable atomic operator being requested by a requesting process can identify the programmable atomic operator by the partition number. The partition number can be established when the programmable atomic operator is registered with (e.g., loaded onto) the programmable atomic unit 302. Other metadata for the programmable instructions can be stored in memory (e.g., in partition tables) in memory local to the programmable atomic unit 302.

In an example, atomic operators manipulate the data cache 310, which is generally synchronized (e.g., flushed) when a thread for an atomic operator completes. Thus, aside from initial loading from the external memory, such as from the memory controller 314, latency can be reduced for most memory operations during execution of a programmable atomic operator thread.

A pipelined processor, such as the PAU core 306, can experience an issue when an executing thread attempts to issue a memory request if an underlying hazard condition would prevent such a request. Here, the memory request is to retrieve data from the memory controller 314, whether it be from a cache on the memory controller 314 or off-die memory. To resolve this issue, the PAU core 306 is configured to deny the memory request for a thread. Generally, the PAU core 306 or the thread control 304 can include circuitry to enable one or more thread rescheduling points in the pipeline. Here, the denial occurs at a point in the pipeline that is beyond (e.g., after) these thread rescheduling points. In an example, the hazard occurred beyond the rescheduling point. Here, a preceding instruction in the thread created the hazard after the memory request instruction passed the last thread rescheduling point prior to the pipeline stage in which the memory request could be made.

In an example, to deny the memory request, the PAU core 306 is configured to determine (e.g., detect) that there is a hazard on memory indicated in the memory request. Here, hazard denotes any condition such that allowing (e.g., performing) the memory request will result in an inconsistent state for the thread. In an example, the hazard is an in-flight memory request. Here, whether or not the data cache 310 includes data for the requested memory address, the presence of the in-flight memory request makes it uncertain what the data in the data cache 310 at that address should be. Thus, the thread must wait for the in-flight memory request to be completed to operate on current data. The hazard is cleared when the memory request completes.

In an example, the hazard is a dirty cache line in the data cache 310 for the requested memory address. Although the dirty cache line generally indicates that the data in the cache is current and the memory controller version of this data is not, an issue can arise on thread instructions that do not operate from the cache. An example of such an instruction uses a built-in atomic operator, or other separate hardware block, of the memory controller 314. In the context of a memory controller, the built-in atomic operators can be separate from the programmable atomic unit 302 and do not have access to the data cache 310 or instruction SRAM 308 inside the PAU. If the cache line is dirty, then the built-in atomic operator will not be operating on the most current data until the data cache 310 is flushed to synchronize the cache and the other or off-die memories. This same situation could occur with other hardware blocks of the memory controller, such as cryptography block, encoder, etc.

Figure 4:
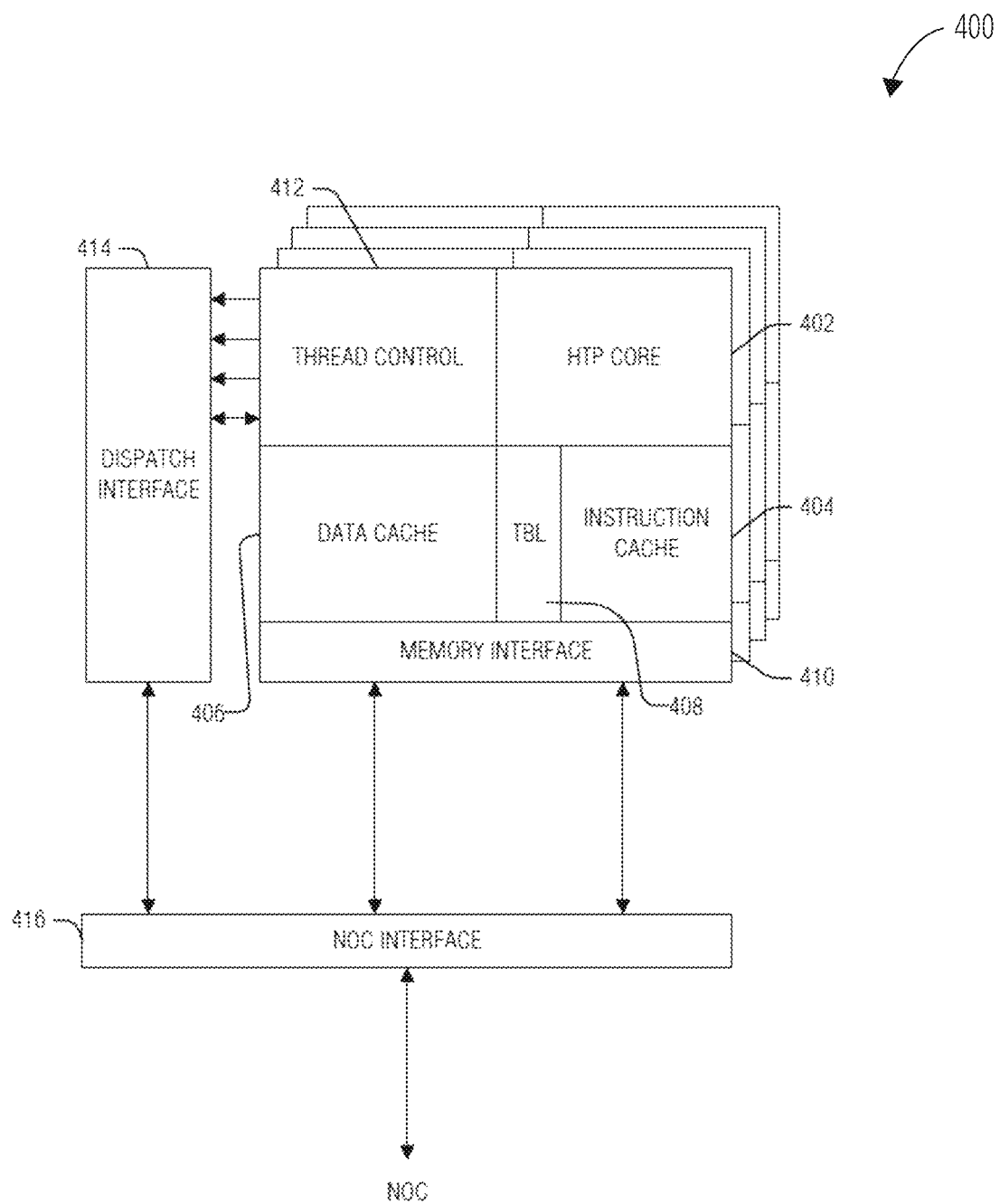
FIG. 4 illustrates an example of a hybrid threading processor (HTP) accelerator of a memory-compute device, according to an embodiment.

FIG. 4 illustrates an example of a hybrid threading processor (HTP) accelerator, or HTP accelerator 400. The HTP accelerator 400 can comprise a portion of a memory-compute device, according to an embodiment. In an example, the HTP accelerator 400 can include or comprise the HTP 140 from the example of FIG. 1. The HTP accelerator 400 includes, for example, a HTP core 402, an instruction cache 404, a data cache 406, a translation block 408, a memory interface 410, and a thread controller 412. The HTP accelerator 400 can further include a dispatch interface 414 and a NOC interface 416, such as for interfacing with a NOC such as the first NOC 118 from the example of FIG. 1, the second NOC 206 from the example of FIG. 2, or other NOC.

In an example, the HTP accelerator 400 includes a module that is based on a RISC-V instruction set, and can include a relatively small number of other or additional custom instructions to support a low-overhead, threading-capable Hybrid Threading (HT) language. The HTP accelerator 400 can include a highly-threaded processor core, the HTP core 402, in which, or with which, threads can be executed in a single instruction rotation, such as to maintain high instruction throughput. In an example, a thread can be paused when it waits for other, pending events to complete. This can allow the compute resources to be efficiently used on relevant work instead of polling. In an example, multiple-thread barrier synchronization can use efficient HTP-to-HTP and HTP-to/from-Host messaging, such as can allow thousands of threads to initialize or wake in, for example, tens of clock cycles.

In an example, the dispatch interface 414 can comprise a functional block of the HTP accelerator 400 for handling hardware-based thread management. That is, the dispatch interface 414 can manage dispatch of work to the HTP core 402 or other accelerators. Non-HTP accelerators, however, are generally not able to dispatch work. In an example, work dispatched from a host can use dispatch queues that reside in, e.g., host main memory (e.g., DRAM-based memory). Work dispatched from the HTP accelerator 400, on the other hand, can use dispatch queues that reside in SRAM, such as within the dispatches for the target HTP accelerator 400 within a particular node.

In an example, the HTP core 402 can comprise one or more cores that execute instructions on behalf of threads. That is, the HTP core 402 can include an instruction processing block. The HTP core 402 can further include, or can be coupled to, the thread controller 412. The thread controller 412 can provide thread control and state for each active thread within the HTP core 402. The data cache 406 can include cache for a host processor (e.g., for local and remote memory-compute devices, including for the HTP core 402), and the instruction cache 404 can include cache for use by the HTP core 402. In an example, the data cache 406 can be configured for read and write operations, and the instruction cache 404 can be configured for read only operations.

In an example, the data cache 406 is a small cache provided per hardware thread. The data cache 406 can temporarily store data for use by the owning thread. The data cache 406 can be managed by hardware or software in the HTP accelerator 400. For example, hardware can be configured to automatically allocate or evict lines as needed, as load and store operations are executed by the HTP core 402. Software, such as using RISC-V instructions, can determine which memory accesses should be cached, and when lines should be invalidated or written back to other memory locations.

Data caching on the HTP accelerator 400 has various benefits, including making larger accesses more efficient for the memory controller, allowing an executing thread to avoid stalling. However, there are situations when using the cache causes inefficiencies. An example includes accesses where data is accessed only once, and causes thrashing of the cache lines. To help address this problem, the HTP accelerator 400 can use a set of custom load instructions to force a load instruction to check for a cache hit, and on a cache miss to issue a memory request for the requested operand and not put the obtained data in the data cache 406. The HTP accelerator 400 thus includes various different types of load instructions, including non-cached and cache line loads. The non-cached load instructions use the cached data if dirty data is present in the cache. The non-cached load instructions ignore clean data in the cache, and do not write accessed data to the data cache. For cache line load instructions, the complete data cache line (e.g., comprising 64 bytes) can be loaded from memory into the data cache 406, and can load the addressed memory into a specified register. These loads can use the cached data if clean or dirty data is in the data cache 406. If the referenced memory location is not in the data cache 406, then the entire cache line can be accessed from memory. Use of the cache line load instructions can reduce cache misses when sequential memory locations are being referenced (such as memory copy operations) but can also waste memory and bandwidth at the NOC interface 416 if the referenced memory data is not used.

In an example, the HTP accelerator 400 includes a custom store instruction that is non-cached. The non-cached store instruction can help avoid thrashing the data cache 406 with write data that is not sequentially written to memory.

In an example, the HTP accelerator 400 further includes a translation block 408. The translation block 408 can include a virtual-to-physical translation block for local memory of a memory-compute device. For example, a host processor, such as in the HTP core 402, can execute a load or store instruction, and the instruction can generate a virtual address. The virtual address can be translated to a physical address of the host processor, such as using a translation table from the translation block 408. The memory interface 410, for example, can include an interface between the HTP core 402 and the NOC interface 416.

Figure 5:
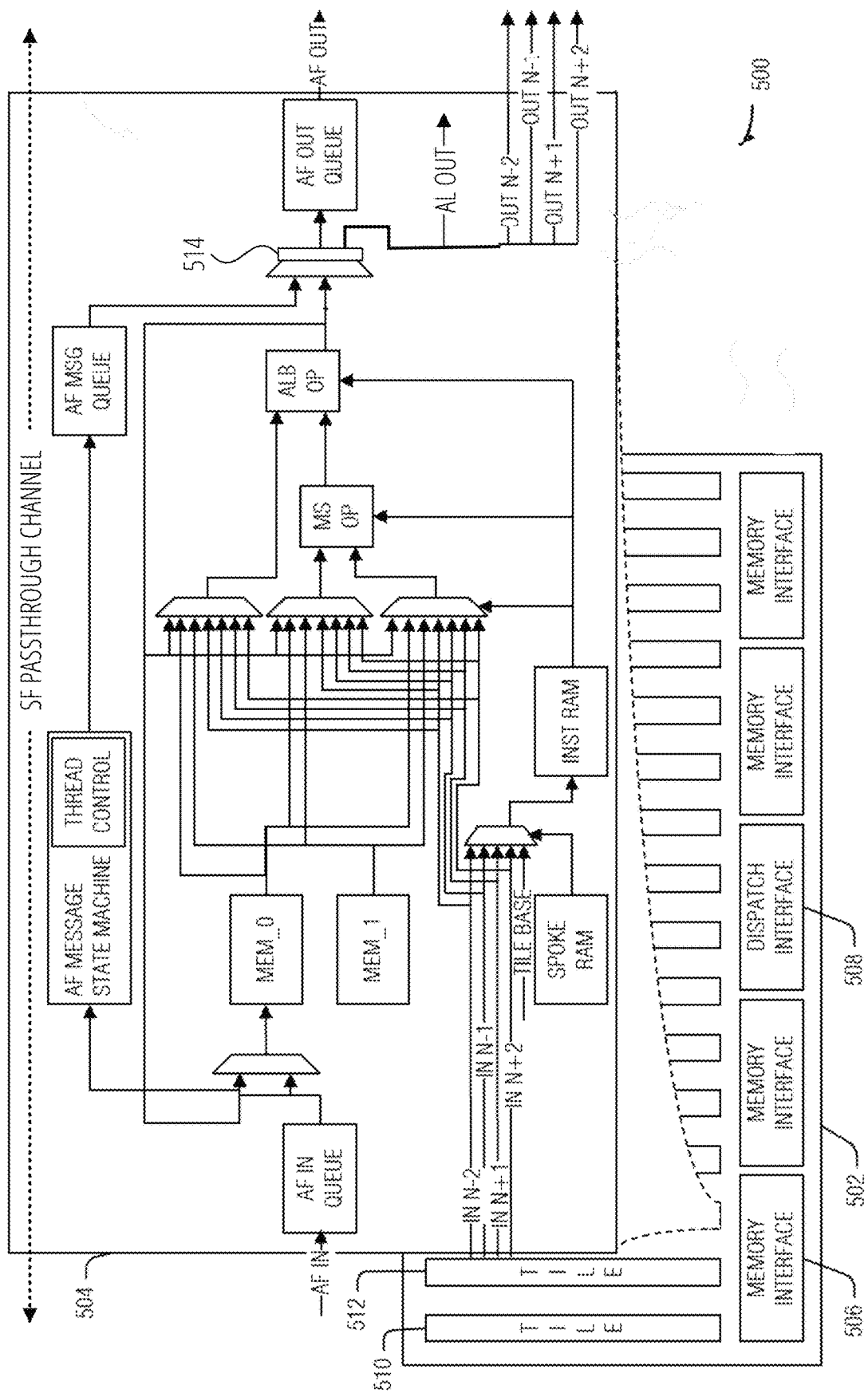
FIG. 5 illustrates an example of a representation of a hybrid threading fabric (HTF) of a memory-compute device, according to an embodiment.

FIG. 5 illustrates an example of a representation of a hybrid threading fabric (HTF), or HTF 500, of a memory-compute device, according to an embodiment. In an example, the HTF 500 can include or comprise the HTF 142 from the example of FIG. 1. The HTF 500 is a coarse-grained, reconfigurable compute fabric that can be optimized for high-level language operand types and operators (e.g., using C/C++ or other high-level language). In an example, the HTF 500 can include configurable, n-bit wide (e.g., 512-bit wide) data paths that interconnect hardened SIMD arithmetic units.

In an example, the HTF 500 comprises an HTF cluster 502 that includes multiple HTF tiles, including an example tile 504, or Tile N. Each HTF tile can comprise one or more compute elements with local tile memory or compute element memory and arithmetic functions. For example, each tile can include a compute pipeline with support for integer and floating-point operations. In an example, the data path, compute elements, and other infrastructure can be implemented as hardened IP to provide maximum performance while minimizing power consumption and reconfiguration time.

In the example of FIG. 5, the tiles in the HTF cluster 502 are coupled using a synchronous fabric (SF), or synchronous compute fabric, to perform synchronous dataflows. The synchronous fabric can provide communication between a particular tile and its neighboring tiles in the HTF cluster 502. Each HTF cluster 502 can further include an asynchronous fabric (AF), or asynchronous compute fabric, that can provide communication among, e.g., the tiles in the cluster, the memory interfaces in the cluster, and a dispatch interface 508 in the cluster.

In an example, the synchronous fabric can exchange messages that include data and control information. The control information can include, among other things, instruction RAM address information or a thread identifier. The control information can be used to set up a data path, and a data message field can be selected as a source for the path. Generally, the control fields can be provided or received earlier, such that they can be used to configure the data path. For example, to help minimize any delay through the synchronous flow pipeline in a tile, the control information can arrive at a tile a few clock cycles before the data field. Various registers can be provided to help coordinate dataflow timing in the pipeline. In an example, the control information can comprise a bitmask portion of data communicated throughout the HTF cluster 502.

In an example, compute elements or tiles in a coarse-grained, reconfigurable architecture or fabric can be arranged a two-dimensional array, such as with data communication and connectivity between nearest neighbors. In a two-dimensional array of compute elements, each element can have up to four connections to its nearest neighbors. However, in such a two-dimensional array, corner compute elements connect to two neighbors and other edge compute elements connect to three neighbors. For arrays with small numbers of compute elements, a relatively large number of the elements are therefore treated as special cases when programming the array. For example, in a sixteen-element array, arranged as a two-dimensional 4×4 array, there are four corners (25%) with two-neighbor connections, eight edges (50%) with three-neighbor connections, and four fully-connected elements (25%) with four-neighbor connections.

The present inventors have recognized, however, that compute elements arranged in a one-dimensional array with connections to nearest neighbors and to neighbors one hop away can offer better connectivity for applications, and more flexibility to kernel compilers, than is available using a two-dimensional array. The present inventors have further recognized that providing a passthrough channel in array elements can further enhance connectivity between non-adjacent tiles in the array.

For example, a one-dimensional array can have more compute elements or tiles that are fully connected (e.g., with four connections per tile). In an example of a sixteen-element array, arranged as a one-dimensional 1×16 array, there are two corners (12.5%) with single-neighbor connections, two edges (12.5%) with two-neighbor connections, and twelve fully connected elements (75%). In other words, using a one-dimensional tile array provides a configuration where 75% of the tiles are fully connected while 25% are special cases (i.e., have reduced connectivity). Accordingly, the one-dimensional array can provide a compiler or scheduler more flexibility when assigning operations to each tile. A pictorial example of a 1×16 array is included at FIG. 9.

The present inventors have further recognized that a loop-type array can be used to further enhance connectivity and reduce special connectivity cases. In an example of a sixteen-element array, arranged as a 2×8 array, all edges can be removed while maintaining relatively short connections between tiles. In this example, ends of each column can be connected to the other column to thereby remove all edges or corners. A pictorial example of a 2×8 array is included at FIG. 10.

In the example of FIG. 5, the tiles comprising the HTF cluster 502 are linearly arranged, such as in a 1×16 array, and each tile in the cluster can be coupled to one or multiple other tiles in the HTF cluster 502. In the example of FIG. 5, the example tile 504, or Tile N, is coupled to four other tiles, including to a base tile 510 (e.g., Tile N−2) via the port labeled SF IN N−2, to an adjacent tile 512 (e.g., Tile N−1) via the port labeled SF IN N−1, and to a Tile N+1 via the port labeled SF IN N+1 and to a Tile N+2 via the port labeled SF IN N+2. A tile can include a base portion, such as can include hardware that is configured to initiate threads or otherwise act as a flow controller. The example tile 504 can be coupled to the same or other tiles via respective output ports, such as those labeled SF OUT N−1, SF OUT N−2, SF OUT N+1, and SF OUT N+2. In this example, the ordered list of names for the various tiles are notional indications of the positions of the tiles. In other examples, the tiles comprising the HTF cluster 502 can be arranged in a grid, loop, or other configuration, with each tile similarly coupled to one or several of its nearest neighbors in the grid. Tiles that are provided at an edge of a cluster can optionally have fewer connections to neighboring tiles. For example, Tile N−2, or the base tile 510 in the example of FIG. 5, can be coupled only to the adjacent tile 512 (Tile N−1) and to the example tile 504 (Tile N). Fewer or additional inter-tile connections can similarly be used.

In the example of FIG. 5, the example tile 504 can include a passthrough channel that can provide a low-latency communication datapath, comprising a portion of the synchronous fabric, between non-adjacent tiles. That is, non-adjacent tiles in an array can be effectively directly coupled using a passthrough channel of one or more intervening tiles. In an illustrative example including Tile N−1, Tile N, and Tile N+1, a passthrough channel in Tile N can be used to couple synchronous fabric inputs and outputs of Tile N−1 and Tile N+1.

The HTF cluster 502 can further include memory interface modules, including a first memory interface module 506. The memory interface modules can couple the HTF cluster 502 to a NOC, such as the first NOC 118. In an example, the memory interface modules can allow tiles within a cluster to make requests to other locations in a memory-compute system, such as in the same or different node in the system. That is, the representation of the HTF 500 can comprise a portion of a larger fabric that can be distributed across multiple nodes, such as with one or more HTF tiles or HTF clusters at each of the nodes. Requests can be made between tiles or nodes within the context of the larger fabric.

In an example, each tile in the HTF cluster 502 can include one or more tile memories. Each tile memory can have the same width as the data path (e.g., 512 bits) and can have a specified depth, such as in a range of 512 to 1024 elements. The tile memories can be used to store data that supports data path operations. The stored data can include constants loaded as part of a kernel's cluster configuration, for example, or can include variables calculated as part of the data flow. In an example, the tile memories can be written from the asynchronous fabric as a data transfer from another synchronous flow, or can include a result of a load operation such as initiated by another synchronous flow. The tile memory can be read via synchronous data path instruction execution in the synchronous flow.

In an example, each tile in an HTF cluster 502 can have a dedicated instruction RAM (INST RAM). In an example of an HTF cluster 502 with sixteen tiles, and respective instruction RAM instances with sixty-four entries, the cluster can allow algorithms to be mapped with up to 1024 multiply-shift and/or ALU operations. The various tiles can optionally be pipelined together, such as using the synchronous fabric, to allow data flow compute with minimal memory access, thus minimizing latency and reducing power consumption. In an example, the asynchronous fabric can allow memory references to proceed in parallel with computation, thereby providing more efficient streaming kernels. In an example, the various tiles can include built-in support for loop-based constructs, and can support nested looping kernels.

The synchronous fabric can allow multiple tiles to be pipelined, such as without a need for data queuing. Tiles that participate in a synchronous domain or synchronous flow can, for example, act as a single pipelined data path. A first or base tile (e.g., Tile N−2, in the example of FIG. 5) of a synchronous flow can initiate a thread of work through the pipelined tiles. The base tile or flow controller can be responsible for starting work on a predefined cadence referred to herein as a Spoke Count. For example, if the Spoke Count is 3, then the base tile can initiate work, or a thread, every third clock cycle.

In an example, a synchronous domain, or elements configured to perform a synchronous flow, comprises a set of connected tiles in the HTF cluster 502. Execution of a thread can begin at the domain's base tile and can progress from the base or flow controller, via the synchronous fabric, to other tiles or compute elements that are a part of the same flow, or in the same domain. The flow controller can provide the instruction to be executed for the first tile. The first tile can, by default, provide the same instruction for the other connected tiles to execute. However, in some examples, the base tile, or a subsequent tile, can conditionally specify or use an alternative instruction. The alternative instruction can be chosen by having the tile's data path produce a Boolean conditional value, and then can use the Boolean value to choose between an instruction set of the current tile and the alternate instruction.

The asynchronous fabric can be used to perform operations that occur asynchronously relative to a synchronous flow. Each tile in the HTF cluster 502 can include an interface to the asynchronous fabric. The inbound interface can include, for example, a FIFO buffer or queue (e.g., AF IN QUEUE) to provide storage for message that cannot be immediately processed. Similarly, the outbound interface of the asynchronous fabric can include a FIFO buffer or queue (e.g., AF OUT QUEUE) to provide storage for messages that cannot be immediately sent out.

In an example, messages in the asynchronous fabric can be classified as data messages or control messages. Data messages can include a SIMD width data value that is written to either tile memory 0 (MEM_0) or memory 1 (MEM_1). Control messages can be configured to control thread creation, to free resources, or to issue external memory references.

A tile in the HTF cluster 502 can perform various compute operations for the HTF. The compute operations can be performed by configuring the data path within the tile and/or compute elements thereof. In an example, a tile includes two functional blocks that perform the compute operations for the tile: a Multiply and Shift Operation block (MS OP) and an Arithmetic, Logical, and Bit Operation block (ALB OP). The two blocks can be configured to perform pipelined operations such as a Multiply and Add, or a Shift and Add, among others. Results from one or more of the functional blocks, or information from the asynchronous queue, can be stored or processed at an output register assembly 514.

In an example, each instance of a memory-compute device in a system can have a complete supported instruction set for its operator blocks (e.g., MS OP and ALB OP). In this case, binary compatibility can be realized across all devices in the system. However, in some examples, it can be helpful to maintain a base set of functionality and optional instruction set classes, such as to meet various design tradeoffs, such as die size. The approach can be similar to how the RISC-V instruction set has a base set and multiple optional instruction subsets.

In an example, the example tile 504 can include a Spoke RAM. The Spoke RAM can be used to specify which input (e.g., from among the four SF tile inputs and the base input) is the primary input for each clock cycle. The Spoke RAM read address input can originate at a counter that counts from zero to Spoke Count minus one. In an example, different Spoke Counts can be used on different tiles, such as within the same HTF cluster 502, to allow a number of slices, or unique tile instances, used by an inner loop to determine the performance of a particular application or instruction set. In an example, the Spoke RAM can specify when a synchronous input is to be written to a tile memory, for instance when multiple inputs for a particular tile instruction are used and one of the inputs arrives before the others. The early-arriving input can be written to the tile memory and can be later read when all of the inputs are available. In this example, the tile memory can be accessed as a FIFO memory, and FIFO read and write pointers can be stored in a register-based memory region or structure in the tile memory.

FIG. 6A and FIG. 6B illustrate generally an example of a chiplet system that can be used to implement one or more aspects of the CNM system 102. As similarly mentioned above, a node in the CNM system 102, or a device within a node in the CNM system 102, can include a chiplet-based architecture or compute-near-memory (CNM) chiplet. A packaged memory-compute device can include, for example, one, two, or four CNM chiplets. The chiplets can be interconnected using high-bandwidth, low-latency interconnects such as using a CPI interface. Generally, a chiplet system is made up of discrete modules (each a "chiplet") that are integrated on an interposer and, in many examples, are interconnected as desired through one or more established networks to provide a system with the desired functionality. The interposer and included chiplets can be packaged together to facilitate interconnection with other components of a larger system. Each chiplet can include one or more individual integrated circuits (ICs), or "chips," potentially in combination with discrete circuit components, and can be coupled to a respective substrate to facilitate attachment to the interposer. Most or all chiplets in a system can be individually configured for communication through established networks.

The configuration of chiplets as individual modules of a system is distinct from such a system being implemented on single chips that contain distinct device blocks (e.g., intellectual property (IP) blocks) on one substrate (e.g., single die), such as a system-on-a-chip (SoC), or multiple discrete packaged devices integrated on a printed circuit board (PCB). In general, chiplets provide better performance (e.g., lower power consumption, reduced latency, etc.) than discrete packaged devices, and chiplets provide greater production benefits than single die chips. These production benefits can include higher yields or reduced development costs and time.

Chiplet systems can include, for example, one or more application (or processor) chiplets and one or more support chiplets. Here, the distinction between application and support chiplets is simply a reference to the likely design scenarios for the chiplet system. Thus, for example, a synthetic vision chiplet system can include, by way of example only, an application chiplet to produce the synthetic vision output along with support chiplets, such as a memory controller chiplet, a sensor interface chiplet, or a communication chiplet. In a typical use case, the synthetic vision designer can design the application chiplet and source the support chiplets from other parties. Thus, the design expenditure (e.g., in terms of time or complexity) is reduced because by avoiding the design and production of functionality embodied in the support chiplets.

Chiplets also support the tight integration of IP blocks that can otherwise be difficult, such as those manufactured using different processing technologies or using different feature sizes (or utilizing different contact technologies or spacings). Thus, multiple ICs or IC assemblies, with different physical, electrical, or communication characteristics can be assembled in a modular manner to provide an assembly with various desired functionalities. Chiplet systems can also facilitate adaptation to suit needs of different larger systems into which the chiplet system will be incorporated. In an example, ICs or other assemblies can be optimized for the power, speed, or heat generation for a specific function—as can happen with sensors—can be integrated with other devices more easily than attempting to do so on a single die. Additionally, by reducing the overall size of the die, the yield for chiplets tends to be higher than that of more complex, single die devices.

FIG. 6A and FIG. 6B illustrate generally an example of a chiplet system, according to an embodiment. FIG. 6A is a representation of the chiplet system 602 mounted on a peripheral board 604, that can be connected to a broader computer system by a peripheral component interconnect express (PCIe), for example. The chiplet system 602 includes a package substrate 606, an interposer 608, and four chiplets, an application chiplet 610, a host interface chiplet 612, a memory controller chiplet 614, and a memory device chiplet 616. Other systems can include many additional chiplets to provide additional functionalities as will be apparent from the following discussion. The package of the chiplet system 602 is illustrated with a lid or cover 618, though other packaging techniques and structures for the chiplet system can be used. FIG. 6B is a block diagram labeling the components in the chiplet system for clarity.

The application chiplet 610 is illustrated as including a chiplet system NOC 620 to support a chiplet network 622 for inter-chiplet communications. In example embodiments the chiplet system NOC 620 can be included on the application chiplet 610. In an example, the first NOC 118 from the example of FIG. 1 can be defined in response to selected support chiplets (e.g., host interface chiplet 612, memory controller chiplet 614, and memory device chiplet 616) thus enabling a designer to select an appropriate number or chiplet network connections or switches for the chiplet system NOC 620. In an example, the chiplet system NOC 620 can be located on a separate chiplet, or within the interposer 608. In examples as discussed herein, the chiplet system NOC 620 implements a chiplet protocol interface (CPI) network.

In an example, the chiplet system 602 can include or comprise a portion of the first memory-compute node 104 or the first memory-compute device 112. That is, the various blocks or components of the first memory-compute device 112 can include chiplets that can be mounted on the peripheral board 604, the package substrate 606, and the interposer 608. The interface components of the first memory-compute device 112 can comprise, generally, the host interface chiplet 612, the memory and memory control-related components of the first memory-compute device 112 can comprise, generally, the memory controller chiplet 614, the various accelerator and processor components of the first memory-compute device 112 can comprise, generally, the application chiplet 610 or instances thereof, and so on.

The CPI interface, such as can be used for communication between or among chiplets in a system, is a packet-based network that supports virtual channels to enable a flexible and high-speed interaction between chiplets. CPI enables bridging from intra-chiplet networks to the chiplet network 622. For example, the Advanced eXtensible Interface (AXI) is a widely used specification to design intra-chip communications. AXI specifications, however, cover a great variety of physical design options, such as the number of physical channels, signal timing, power, etc. Within a single chip, these options are generally selected to meet design goals, such as power consumption, speed, etc. However, to achieve the flexibility of the chiplet system, an adapter, such as CPI, is used to interface between the various AXI design options that can be implemented in the various chiplets. By enabling a physical channel to virtual channel mapping and encapsulating time-based signaling with a packetized protocol, CPI bridges intra-chiplet networks across the chiplet network 622.

CPI can use a variety of different physical layers to transmit packets. The physical layer can include simple conductive connections, or can include drivers to increase the voltage, or otherwise facilitate transmitting the signals over longer distances. An example of one such a physical layer can include the Advanced Interface Bus (AIB), which in various examples, can be implemented in the interposer 608. AIB transmits and receives data using source synchronous data transfers with a forwarded clock. Packets are transferred across the AIB at single data rate (SDR) or dual data rate (DDR) with respect to the transmitted clock. Various channel widths are supported by AIB. The channel can be configured to have a symmetrical number of transmit (TX) and receive (RX) input/outputs (I/Os), or have a non-symmetrical number of transmitters and receivers (e.g., either all transmitters or all receivers). The channel can act as an AIB principal or subordinate depending on which chiplet provides the principal clock. AIB I/O cells support three clocking modes: asynchronous (i.e. non-clocked), SDR, and DDR. In various examples, the non-clocked mode is used for clocks and some control signals. The SDR mode can use dedicated SDR only I/O cells, or dual use SDR/DDR I/O cells.

In an example, CPI packet protocols (e.g., point-to-point or routable) can use symmetrical receive and transmit I/O cells within an AIB channel. The CPI streaming protocol allows more flexible use of the AIB I/O cells. In an example, an AIB channel for streaming mode can configure the I/O cells as all TX, all RX, or half TX and half RX. CPI packet protocols can use an AIB channel in either SDR or DDR operation modes. In an example, the AIB channel is configured in increments of 80 I/O cells (i.e. 40 TX and 40 RX) for SDR mode and 40 I/O cells for DDR mode. The CPI streaming protocol can use an AIB channel in either SDR or DDR operation modes. Here, in an example, the AIB channel is in increments of 40 I/O cells for both SDR and DDR modes. In an example, each AIB channel is assigned a unique interface identifier. The identifier is used during CPI reset and initialization to determine paired AIB channels across adjacent chiplets. In an example, the interface identifier is a 20-bit value comprising a seven-bit chiplet identifier, a seven-bit column identifier, and a six-bit link identifier. The AIB physical layer transmits the interface identifier using an AIB out-of-band shift register. The 20-bit interface identifier is transferred in both directions across an AIB interface using bits 32-51 of the shift registers.

AIB defines a stacked set of AIB channels as an AIB channel column. An AIB channel column has some number of AIB channels, plus an auxiliary channel. The auxiliary channel contains signals used for AIB initialization. All AIB channels (other than the auxiliary channel) within a column are of the same configuration (e.g., all TX, all RX, or half TX and half RX, as well as having the same number of data I/O signals). In an example, AIB channels are numbered in continuous increasing order starting with the AIB channel adjacent to the AUX channel. The AIB channel adjacent to the AUX is defined to be AIB channel zero.

Generally, CPI interfaces on individual chiplets can include serialization-deserialization (SERDES) hardware. SERDES interconnects work well for scenarios in which high-speed signaling with low signal count are desirable. SERDES, however, can result in additional power consumption and longer latencies for multiplexing and demultiplexing, error detection or correction (e.g., using block level cyclic redundancy checking (CRC)), link-level retry, or forward error correction. However, when low latency or energy consumption is a primary concern for ultra-short reach, chiplet-to-chiplet interconnects, a parallel interface with clock rates that allow data transfer with minimal latency can be utilized. CPI includes elements to minimize both latency and energy consumption in these ultra-short reach chiplet interconnects.

For flow control, CPI employs a credit-based technique. A recipient, such as the application chiplet 610, provides a sender, such as the memory controller chiplet 614, with credits that represent available buffers. In an example, a CPI recipient includes a buffer for each virtual channel for a given time-unit of transmission. Thus, if the CPI recipient supports five messages in time and a single virtual channel, the recipient has five buffers arranged in five rows (e.g., one row for each unit time). If four virtual channels are supported, then the recipient has twenty buffers arranged in five rows. Each buffer holds the payload of one CPI packet.

When the sender transmits to the recipient, the sender decrements the available credits based on the transmission. Once all credits for the recipient are consumed, the sender stops sending packets to the recipient. This ensures that the recipient always has an available buffer to store the transmission.

As the recipient processes received packets and frees buffers, the recipient communicates the available buffer space back to the sender. This credit return can then be used by the sender allow transmitting of additional information.

The example of FIG. 6A includes a chiplet mesh network 624 that uses a direct, chiplet-to-chiplet technique without a need for the chiplet system NOC 620. The chiplet mesh network 624 can be implemented in CPI, or another chiplet-to-chiplet protocol. The chiplet mesh network 624 generally enables a pipeline of chiplets where one chiplet serves as the interface to the pipeline while other chiplets in the pipeline interface only with themselves.

Additionally, dedicated device interfaces, such as one or more industry standard memory interfaces (such as, for example, synchronous memory interfaces, such as DDR5, DDR6), can be used to connect a device to a chiplet. Connection of a chiplet system or individual chiplets to external devices (such as a larger system can be through a desired interface (for example, a PCIe interface). Such an external interface can be implemented, in an example, through the host interface chiplet 612, which in the depicted example, provides a PCIe interface external to chiplet system. Such dedicated chiplet interfaces 626 are generally employed when a convention or standard in the industry has converged on such an interface. The illustrated example of a Double Data Rate (DDR) interface connecting the memory controller chiplet 614 to a dynamic random access memory (DRAM) memory device chiplet 616 is just such an industry convention.

Of the variety of possible support chiplets, the memory controller chiplet 614 is likely present in the chiplet system due to the near omnipresent use of storage for computer processing as well as sophisticated state-of-the-art for memory devices. Thus, using memory device chiplets 616 and memory controller chiplets 614 produced by others gives chiplet system designers access to robust products by sophisticated producers. Generally, the memory controller chiplet 614 provides a memory device-specific interface to read, write, or erase data. Often, the memory controller chiplet 614 can provide additional features, such as error detection, error correction, maintenance operations, or atomic operator execution. For some types of memory, maintenance operations tend to be specific to the memory device chiplet 616, such as garbage collection in NAND flash or storage class memories, temperature adjustments (e.g., cross temperature management) in NAND flash memories. In an example, the maintenance operations can include logical-to-physical (L2P) mapping or management to provide a level of indirection between the physical and logical representation of data. In other types of memory, for example DRAM, some memory operations, such as refresh can be controlled by a host processor or of a memory controller at some times, and at other times controlled by the DRAM memory device, or by logic associated with one or more DRAM devices, such as an interface chip (in an example, a buffer).

Atomic operators are a data manipulation that, for example, can be performed by the memory controller chiplet 614. In other chiplet systems, the atomic operators can be performed by other chiplets. For example, an atomic operator of "increment" can be specified in a command by the application chiplet 610, the command including a memory address and possibly an increment value. Upon receiving the command, the memory controller chiplet 614 retrieves a number from the specified memory address, increments the number by the amount specified in the command, and stores the result. Upon a successful completion, the memory controller chiplet 614 provides an indication of the command success to the application chiplet 610. Atomic operators avoid transmitting the data across the chiplet mesh network 624, resulting in lower latency execution of such commands.

Atomic operators can be classified as built-in atomics or programmable (e.g., custom) atomics. Built-in atomics are a finite set of operations that are immutably implemented in hardware. Programmable atomics are small programs that can execute on a programmable atomic unit (PAU) (e.g., a custom atomic unit (CAU)) of the memory controller chiplet 614.

The memory device chiplet 616 can be, or include any combination of, volatile memory devices or non-volatile memories. Examples of volatile memory devices include, but are not limited to, random access memory (RAM)—such as DRAM) synchronous DRAM (SDRAM), graphics double data rate type 6 SDRAM (GDDR6 SDRAM), among others. Examples of non-volatile memory devices include, but are not limited to, negative-and-(NAND)-type flash memory, storage class memory (e.g., phase-change memory or memristor based technologies), ferroelectric RAM (FeRAM), among others. The illustrated example includes the memory device chiplet 616 as a chiplet, however, the device can reside elsewhere, such as in a different package on the peripheral board 604. For many applications, multiple memory device chiplets can be provided. In an example, these memory device chiplets can each implement one or multiple storage technologies, and may include integrated compute hosts. In an example, a memory chiplet can include, multiple stacked memory die of different technologies, for example one or more static random access memory (SRAM) devices stacked or otherwise in communication with one or more dynamic random access memory (DRAM) devices. In an example, the memory controller chiplet 614 can serve to coordinate operations between multiple memory chiplets in the chiplet system 602, for example, to use one or more memory chiplets in one or more levels of cache storage, and to use one or more additional memory chiplets as main memory. The chiplet system 602 can include multiple memory controller chiplet 614 instances, as can be used to provide memory control functionality for separate hosts, processors, sensors, networks, etc. A chiplet architecture, such as in the illustrated system, offers advantages in allowing adaptation to different memory storage technologies; and different memory interfaces, through updated chiplet configurations, such as without requiring redesign of the remainder of the system structure.

Figure 7:
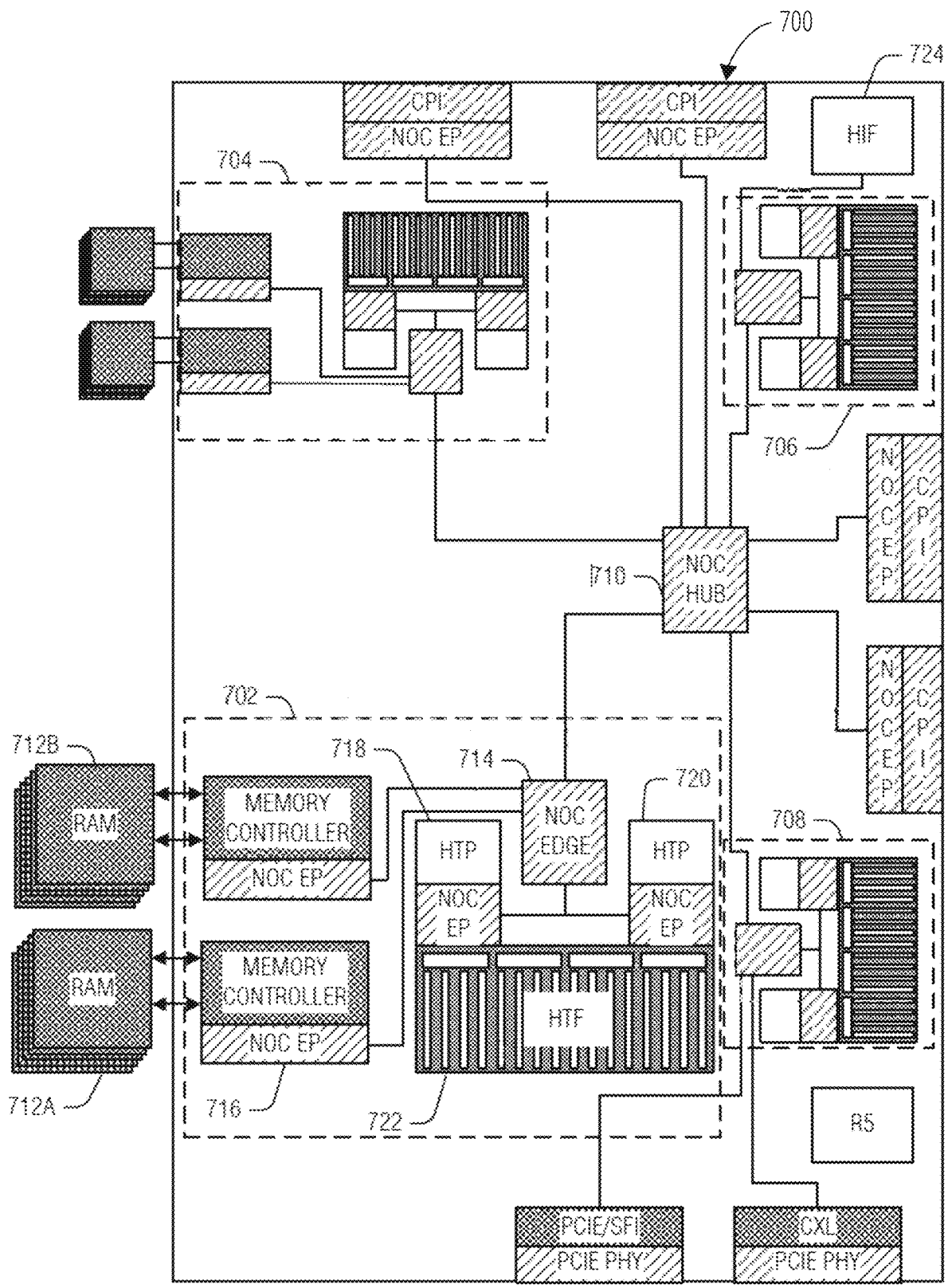
FIG. 7 illustrates generally an example of a chiplet-based implementation for a memory-compute device, according to an embodiment.

FIG. 7 illustrates generally an example of a chiplet-based implementation for a memory-compute device, according to an embodiment. The example includes an implementation with four compute-near-memory, or CNM, chiplets, and each of the CNM chiplets can include or comprise portions of the first memory-compute device 112 or the first memory-compute node 104 from the example of FIG. 1. The various portions can themselves include or comprise respective chiplets. The chiplet-based implementation can include or use CPI-based intra-system communications, as similarly discussed above in the example chiplet system 602 from FIG. 6A and FIG. 6B.

The example of FIG. 7 includes a first CNM package 700 comprising multiple chiplets. The first CNM package 700 includes a first chiplet 702, a second chiplet 704, a third chiplet 706, and a fourth chiplet 708 coupled to a CNM NOC hub 710. Each of the first through fourth chiplets can comprise instances of the same, or substantially the same, components or modules. For example, the chiplets can each include respective instances of an HTP accelerator, an HTF accelerator, and memory controllers for accessing internal or external memories.

In the example of FIG. 7, the first chiplet 702 includes a first NOC hub edge 714 coupled to the CNM NOC hub 710. The other chiplets in the first CNM package 700 similarly include NOC hub edges or endpoints. The switches in the NOC hub edges facilitate intra-chiplet, or intra-chiplet-system, communications via the CNM NOC hub 710.

The first chiplet 702 can further include one or multiple memory controllers 716. The memory controllers 716 can correspond to respective different NOC endpoint switches interfaced with the first NOC hub edge 714. In an example, the memory controller 716 comprises the memory controller chiplet 614 or comprises the memory controller 130, or comprises the memory subsystem 200, or other memory-compute implementation. The memory controllers 716 can be coupled to respective different memory devices, for example including a first external memory module 712a or a second external memory module 712b. The external memory modules can include, e.g., GDDR6 memories that can be selectively accessed by the respective different chiplets in the system.

The first chiplet 702 can further include a first HTP chiplet 718 and second HTP chiplet 720, such as coupled to the first NOC hub edge 714 via respective different NOC endpoint switches. The HTP chiplets can correspond to HTP accelerators, such as the HTP 140 from the example of FIG. 1, or the HTP accelerator 400 from the example of FIG. 4. The HTP chiplets can communicate with the HTF chiplet 722. The HTF chiplet 722 can correspond to an HTF accelerator, such as the HTF 142 from the example of FIG. 1, or the HTF 500 from the example of FIG. 5.

The CNM NOC hub 710 can be coupled to NOC hub instances in other chiplets or other CNM packages by way of various interfaces and switches. For example, the CNM NOC hub 710 can be coupled to a CPI interface by way of multiple different NOC endpoints on the first CNM package 700. Each of the multiple different NOC endpoints can be coupled, for example, to a different node outside of the first CNM package 700. In an example, the CNM NOC hub 710 can be coupled to other peripherals, nodes, or devices using CTCPI or other, non-CPI protocols. For example, the first CNM package 700 can include a PCIe scale fabric interface (PCIE/SFI) or a CXL interface (CXL) configured to interface the first CNM package 700 with other devices. In an example, devices to which the first CNM package 700 is coupled using the various CPI, PCIe, CXL, or other fabric, can make up a common global address space.

In the example of FIG. 7, the first CNM package 700 includes a host interface 724 (HIF) and a host processor (R5). The host interface 724 can correspond to, for example, the HIF 120 from the example of FIG. 1. The host processor, or R5, can correspond to the internal host processor 122 from the example of FIG. 1. The host interface 724 can include a PCI interface for coupling the first CNM package 700 to other external devices or systems. In an example, work can be initiated on the first CNM package 700, or a tile cluster within the first CNM package 700, by the host interface 724. For example, the host interface 724 can be configured to command individual HTF tile clusters, such as among the various chiplets in the first CNM package 700, into and out of power/clock gate modes.

Figure 8:
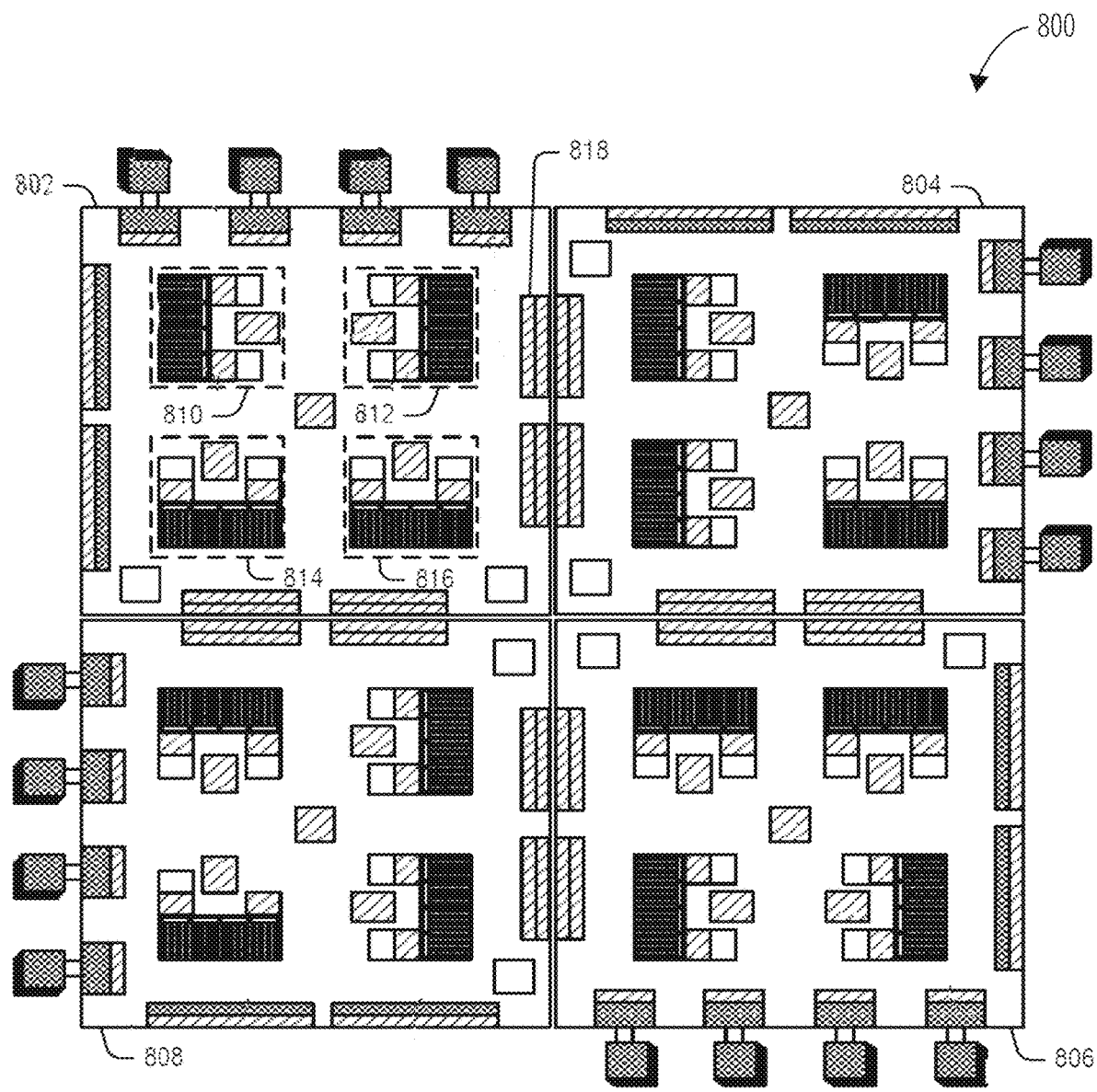
FIG. 8 illustrates an example tiling of memory-compute device chiplets, according to an embodiment.

FIG. 8 illustrates an example tiling of memory-compute devices, according to an embodiment. In FIG. 8, a tiled chiplet example 800 includes four instances of different compute-near-memory clusters of chiplets, where the clusters are coupled together. Each instance of a compute-near-memory chiplet can itself include one or more constituent chiplets (e.g., host processor chiplets, memory device chiplets, interface chiplets, and so on).

The tiled chiplet example 800 includes, as one or multiple of its compute-near-memory (CNM) clusters, instances of the first CNM package 700 from the example of FIG. 7. For example, the tiled chiplet example 800 can include a first CNM cluster 802 that includes a first chiplet 810 (e.g., corresponding to the first chiplet 702), a second chiplet 812 (e.g., corresponding to the second chiplet 704), a third chiplet 814 (e.g., corresponding to the third chiplet 706), and a fourth chiplet 816 (e.g., corresponding to the fourth chiplet 708). The chiplets in the first CNM cluster 802 can be coupled to a common NOC hub, which in turn can be coupled to a NOC hub in an adjacent cluster or clusters (e.g., in a second CNM cluster 804 or a fourth CNM cluster 808).

In the example of FIG. 8, the tiled chiplet example 800 includes the first CNM cluster 802, the second CNM cluster 804, a third CNM cluster 806, and the fourth CNM cluster 808. The various different CNM chiplets can be configured in a common address space such that the chiplets can allocate and share resources across the different tiles. In an example, the chiplets in the cluster can communicate with each other. For example, the first CNM cluster 802 can be communicatively coupled to the second CNM cluster 804 via an inter-chiplet CPI interface 818, and the first CNM cluster 802 can be communicatively coupled to the fourth CNM cluster 808 via another or the same CPI interface. The second CNM cluster 804 can be communicatively coupled to the third CNM cluster 806 via the same or other CPI interface, and so on.

In an example, one of the compute-near-memory chiplets in the tiled chiplet example 800 can include a host interface (e.g., corresponding to the host interface 724 from the example of FIG. 7) that is responsible for workload balancing across the tiled chiplet example 800. The host interface can facilitate access to host-based command request queues and response queues, such as from outside of the tiled chiplet example 800. The host interface can dispatch new threads of execution using hybrid threading processors and the hybrid threading fabric in one or more of the compute-near-memory chiplets in the tiled chiplet example 800.

Figure 9:
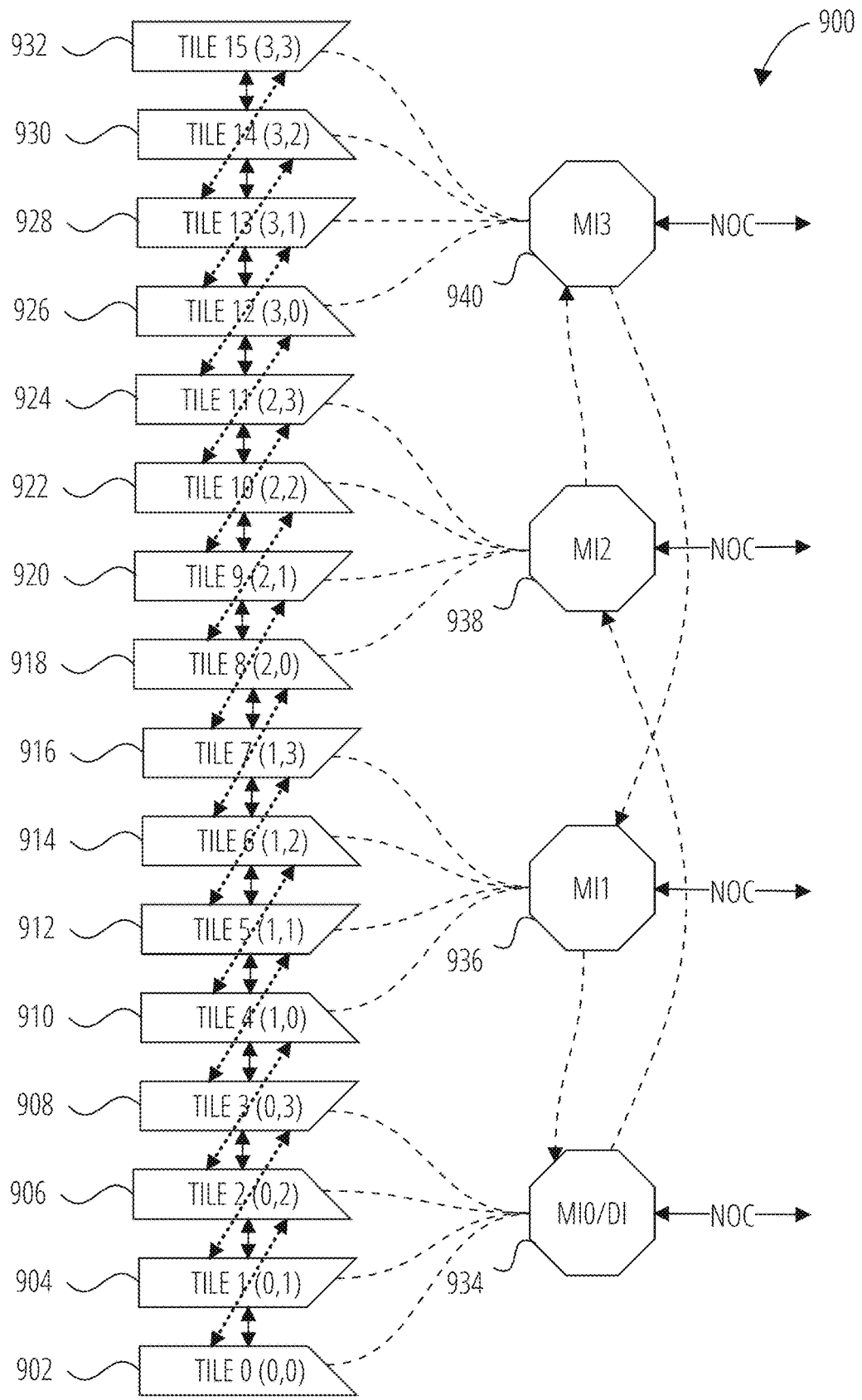
FIG. 9 illustrates generally an example of a first tile system comprising a portion of a hybrid threading fabric.

FIG. 9 illustrates generally an example of a first tile system 900 comprising a portion of a hybrid threading fabric. In an example, the first tile system 900 comprises a portion of the HTF 142, or comprises the HTF 500 from the example of FIG. 5. The example of FIG. 9 includes a 1×16 array of tiles (labeled Tile 0 through Tile 15) that comprise a portion of a reconfigurable compute array. Each of the tiles can comprise an instance of the example tile 504 from FIG. 5. That is, each tile can include its own respective memory or memories, compute element or functional element, registers, and inputs and outputs providing connectivity to other tiles in the system, among other components.

In the example of FIG. 9, the several tiles in the first tile system 900 are grouped into four groups of four tiles each, and each group is associated with a memory interface and/or a dispatch interface. For example, a first group of tiles includes a first tile 902, a second tile 904, a third tile 906, and a fourth tile 908 coupled to a first memory interface 934. The first memory interface 934 can be coupled to a NOC, such as the NOC interface 416, to provide communication between tiles in the first group and other tiles, other tile systems, or other system resources. In other tile systems, the tiles can be differently grouped or configured, such as to include fewer or more than four tiles per group.

Each tile in the first tile system 900 can have associated notional coordinates that indicates the particular tile and the memory interface with which it communicates. For example, the first tile 902 can have coordinates (0,0) to indicate that the first tile 902 is associated with the first memory interface 934 MI0 and to indicate that the first tile 902 is the first tile (i.e., Tile 0) in the first tile system 900.

The second tile 904 can have coordinates (0,1) to indicate that the second tile 904 is associated with the first memory interface 934 MI0 and to indicate that the second tile 904 is the second tile (i.e., Tile 1) in the first tile system 900.

A second group of tiles in the first tile system 900 includes a fifth tile 910 (Tile 4), sixth tile 912 (Tile 5), seventh tile 914 (Tile 6), and eighth tile 916 (Tile 7) coupled to a second memory interface 936 (MI1). A third group of tiles in the first tile system 900 includes a ninth tile 918 (Tile 8), tenth tile 920 (Tile 9), eleventh tile 922 (Tile 10), and twelfth tile 924 (Tile 11) coupled to a third memory interface 938 (MI2). A fourth group of tiles in the first tile system 900 includes a thirteenth tile 926 (Tile 12), fourteenth tile 928 (Tile 13), fifteenth tile 930 (Tile 14), and sixteenth tile 932 (Tile 15) coupled to a fourth memory interface 940 (MI3). The notional coordinates for the various tiles Tile 4 through Tile 15 are illustrated in the example of FIG. 9. Each of the different memory interfaces, such as the first memory interface 934, the second memory interface 936, third memory interface 938, or fourth memory interface 940 can be coupled to the same or different NOC. In an example, each memory interface can be configured to receive instructions from the NOC and, in response, initiate or participate in one or more synchronous flows using tiles associated with the interface. In the example of FIG. 9, the first memory interface 934 comprises a dispatch interface that is configured to receive synchronous flow instructions and initiate threads using one or more of the groups of tiles in the first tile system 900.

The example of FIG. 9 illustrates the synchronous and asynchronous fabrics that couple the various tiles and memory interfaces. In the example, solid lines that couple pairs of tiles indicate first portions of the synchronous fabric. Dashed bolded lines that couple other pairs of tiles indicate second portions of the synchronous fabric. Dashed unbolded lines that couple the various tiles to the memory interfaces indicate portions of the asynchronous fabric. Arrowheads in the illustration indicate a direction of data flow and can, where indicated, include bidirectional communication. For ease of illustration, each line may represent one or multiple different unidirectional or bidirectional data communication channels.

In an example, the synchronous fabric can include a passthrough channel that extends through or across at least one tile to communicatively couple two other tiles. In the illustrated example, the synchronous fabric can include a bidirectional communication channel that directly couples the first tile 902 to the second tile 904, as indicated by the solid line coupling the two tiles. The synchronous fabric can further include a bidirectional communication channel that directly couples the second tile 904 to the third tile 906, as indicated by the solid line coupling the two tiles. The synchronous fabric can further include a bidirectional communication channel that couples the first tile 902 to the third tile 906, such as using a bidirectional passthrough channel in the second tile 904, as indicated by the dashed bolded line coupling the first tile 902 to the third tile 906. In this manner, the first tile 902 is coupled to each of an adjacent tile (i.e., the second tile 904) and to a tile that is one hop away (i.e., the third tile 906, which is one "hop" or one tile position away from the first tile 902) using the synchronous fabric, such as can be used for synchronous data flows executed by the first tile system 900.

In the example of FIG. 9, each of the third through fourteenth tiles (Tile 2 through Tile 13) has full or maximum connectivity to its neighbors via the synchronous fabric, each of the second and fifteenth tiles (Tile 1 and Tile 14) has intermediate connectivity to its neighbors, and each of the first and sixteenth tiles (Tile 0 and Tile 15) has minimal connectivity via the synchronous fabric.

Tile 0 is considered to have minimal connectivity because it has one adjacent neighbor rather than two, and has one neighbor that is one hop away rather than two such neighbors. For example, Tile 0 is coupled to its one adjacent tile, Tile 1, via a direct bus in the synchronous fabric. Tile 0 is further coupled to one tile that is one hop away, Tile 2, via a passthrough channel or bus in Tile 1.

Tile 1 is considered to have intermediate connectivity because it has two adjacent neighbor tiles (e.g., Tile 0 and Tile 2), and has one neighbor that is one hop away rather than two such neighbors. For example, Tile 1 is coupled to its adjacent tiles, Tile 0 and Tile 2, via respective busses in the synchronous fabric. Tile 1 is further coupled to one tile that is one hop away, Tile 3, via a passthrough channel or bus in Tile 2.

Tile 2 is considered to have maximum or full connectivity because it has two adjacent neighbor tiles (e.g., Tile 0 and Tile 2), and has two neighbors that are one hop away. For example, Tile 2 is coupled to its adjacent tiles, Tile 1 and Tile 3, via respective busses in the synchronous fabric. Tile 2 is further coupled to tiles that are one hop away in respective different directions. For example, Tile 2 is coupled to Tile 0 via a passthrough channel or bus in Tile 1, and Tile 2 is further coupled to Tile 4 via a passthrough channel or bus in Tile 3.

In the example of FIG. 9, each of the various tiles is coupled to a respective one of the memory interfaces using the asynchronous fabric, and each of the memory interfaces is further coupled with the other memory interfaces using the asynchronous fabric. For example, the first group of tiles Tile 0 through Tile 3 is coupled to the first memory interface 934 using respective asynchronous fabric channels, the second group of tiles Tile 4 through Tile 7 is coupled to the second memory interface 936 using respective asynchronous fabric channels, the third group of tiles Tile 8 through Tile 11 is coupled to the third memory interface 938 using respective asynchronous fabric channels, and the fourth group of tiles Tile 12 through Tile 15 is coupled to the fourth memory interface 940 using respective asynchronous fabric channels.

In the example of FIG. 9, the memory interfaces are coupled using unidirectional communication channels that provide a communication loop among the interfaces. For example, using the asynchronous fabric, the first memory interface 934 is configured to communicate information to the third memory interface 938, the third memory interface 938 is configured to communicate information to the fourth memory interface 940, the fourth memory interface 940 is configured to communicate information to the second memory interface 936, and the second memory interface 936 is configured to communicate information to the first memory interface 934. The memory interfaces can optionally be differently coupled, such as using bidirectional channels of the asynchronous fabric, or can be coupled in other than a loop configuration. Each of the memory interfaces can be respectively coupled to the NOC using a NOC bus or portion of a NOC fabric.

Figure 10:
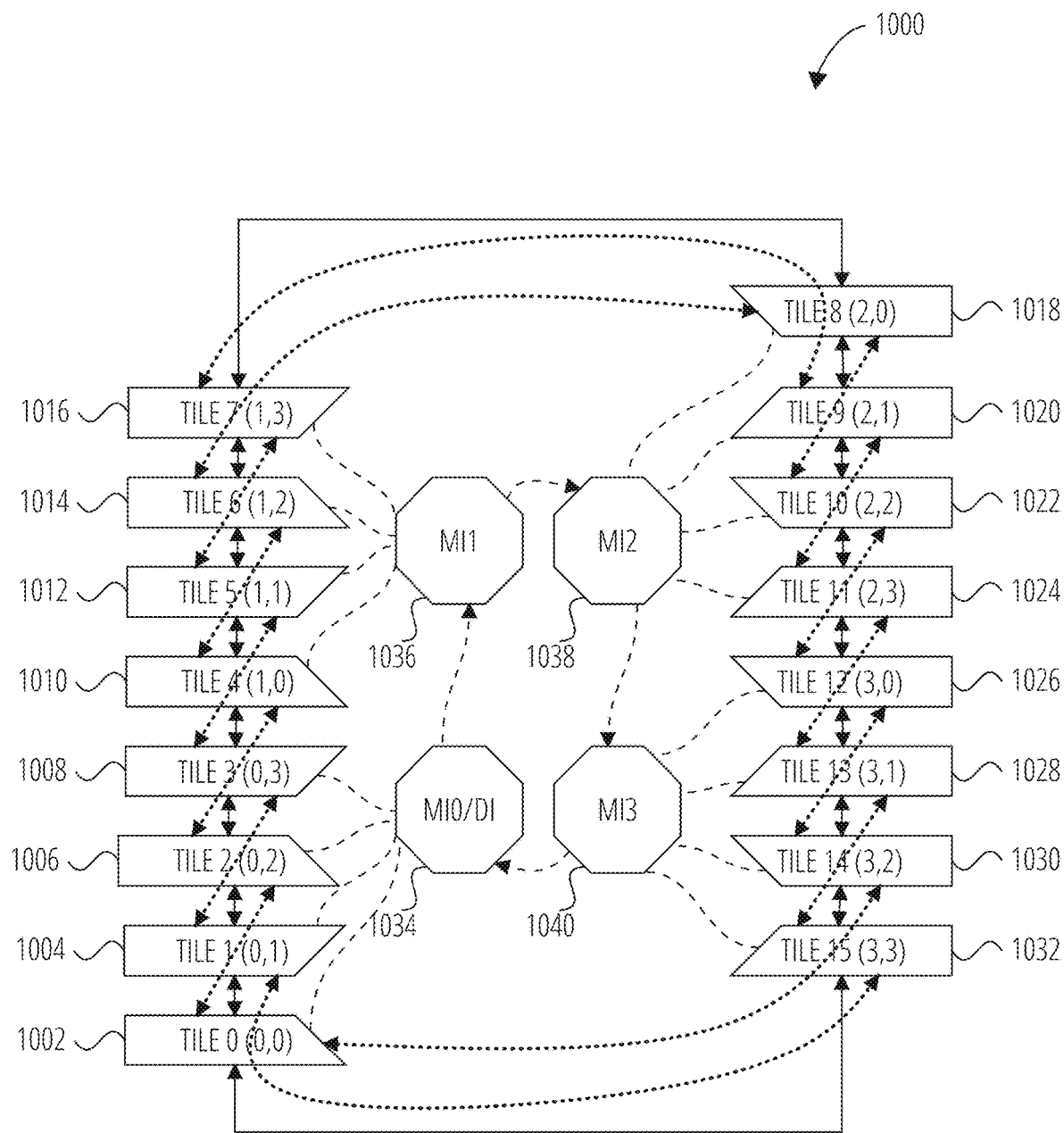
FIG. 10 illustrates generally an example of a second tile system comprising a portion of a hybrid threading fabric.

FIG. 10 illustrates generally an example of a second tile system 1000 comprising a portion of a hybrid threading fabric. In an example, the second tile system 1000 comprises sixteen tiles as similarly provided in the example of the first tile system 900 from FIG. 9, however, the tiles in the second tile system 1000 have different connectivity than the tiles in the first tile system 900.

In an example, the second tile system 1000 comprises a portion of the HTF 142, or comprises the HTF 500 from the example of FIG. 5. The example of FIG. 10 includes a 2×8 array of tiles (labeled Tile 0 through Tile 15) that comprise a portion of a reconfigurable compute array. Each of the tiles can comprise an instance of the example tile 504 from FIG. 5. That is, each tile can include its own respective memory or memories, compute element or functional element, registers, and inputs and outputs providing connectivity to other tiles in the system, among other components. The second tile system 1000 can have different tile connectivity characteristics than the first tile system 900. For example, the tiles in the second tile system 1000 can be arranged in a toroidal or loop configuration such that all of the tiles have maximum connectivity, as further described below.

The tiles in the example of FIG. 10 can be grouped and associated with particular memory interfaces. For example, the second tile system 1000 can include a first group with a first memory interface 1034 coupled, via a portion of an asynchronous fabric, to a first tile 1002 (Tile 0), a second tile 1004 (Tile 1), a third tile 1006 (Tile 2), and a fourth tile 1008 (Tile 3). The second tile system 1000 can include a second group with a second memory interface 1036 coupled, via the asynchronous fabric, to a fifth tile 1010 (Tile 4), a sixth tile 1012 (Tile 5), a seventh tile 1014 (Tile 6), and an eighth tile 1016 (Tile 7). The second tile system 1000 can include a third group with a third memory interface 1038 coupled, via the asynchronous fabric, to a ninth tile 1018 (Tile 8), a tenth tile 1020 (Tile 9), an eleventh tile 1022 (Tile 10), and a twelfth tile 1024 (Tile 11). The second tile system 1000 can include a fourth group with a fourth memory interface 1040 coupled, via the asynchronous fabric, to a thirteenth tile 1026 (Tile 12), a fourteenth tile 1028 (Tile 13), a fifteenth tile 1030 (Tile 14), and a sixteenth tile 1032 (Tile 15). In the example of FIG. 10, the first memory interface 1034 comprises a dispatch interface that is configured to receive synchronous flow instructions and initiate threads using one or more of the groups of tiles in the second tile system 1000.

The memory interfaces 1034-1040 can be coupled to a NOC, such as the NOC interface 416, to provide communication between or among tiles in the group, other tiles in the system, or other system resources. In other example tile systems, the tiles can be differently grouped or configured, such as to include fewer or more than four tiles per group. Each of the different memory interfaces, such as the first memory interface 1034, the second memory interface 1036, the third memory interface 1038, or the fourth memory interface 1040, can be coupled to the same or different NOC. In an example, each memory interface can be configured to receive instructions from the NOC and, in response, initiate or participate in one or more synchronous flows using tiles associated with the interface.

The example of FIG. 10 illustrates the synchronous and asynchronous fabrics that couple the various tiles and memory interfaces using the same conventions established in FIG. 9. That is, the solid lines that couple pairs of tiles indicate portions of a synchronous fabric, dashed bolded lines that couple pairs of tiles indicate other portions of the synchronous fabric, and dashed unbolded lines that couple the various tiles to the memory interfaces indicate portions of an asynchronous fabric. Arrowheads in the illustration indicate a direction of data flow and can, where indicated, include bidirectional communication. As in the example of FIG. 9, the second tile system 1000 includes tiles that can include or use a passthrough channel that extends through or across at least one tile to communicatively couple two other tiles.

In the example of FIG. 10, each of the first through sixteenth tiles (Tile 0 through Tile 15) can have full or maximum connectivity to its neighbors via the synchronous fabric. In other words, none of the tiles in the second tile system 1000 provides a special or unique connectivity case. In the example, each tile is considered to have maximum or full connectivity because it has two adjacent neighbor tiles and two neighbors that are one hop away. The full connectivity is provided because the top and bottom tiles of each column of the 2×8 array of tiles is coupled to the respective other column. For example, at one end of the first column of the 2×8 array comprising Tile 0 through Tile 7, the first tile 1002 or Tile 0 is coupled to its adjacent tiles, Tile 1 and Tile 15, via respective busses in the synchronous fabric. Tile 0 is further coupled to tiles that are one hop away in respective different directions. For example, Tile 0 is coupled to Tile 2 via a passthrough channel or bus in Tile 1, and Tile 0 is further coupled to Tile 14 via a passthrough channel or bus in Tile 15. At an opposite end of the first column of the 2×8 array comprising Tile 0 through Tile 7, the eighth tile 1016 or Tile 7 is coupled to its adjacent tiles, Tile 6 and Tile 8, via respective busses in the synchronous fabric. Tile 7 is further coupled to tiles that are one hop away in respective different directions. For example, Tile 7 is coupled to Tile 5 via a passthrough channel or bus in Tile 6, and Tile 7 is further coupled to Tile 9 via a passthrough channel or bus in tile 8. Tile 8 and Tile 15, at the ends of the second column of the 2×8 array of tiles, are similarly configured to Tile 0 and Tile 7 to enhance connectivity.

In the example of FIG. 10, each of the various tiles is coupled to a respective one of the memory interfaces using the asynchronous fabric, and each of the memory interfaces is further coupled with the other memory interfaces using the asynchronous fabric. For example, the first group of tiles Tile 0 through Tile 3 is coupled to the first memory interface 1034 using respective asynchronous fabric channels, the second group of tiles Tile 4 through Tile 7 is coupled to the second memory interface 1036 using respective asynchronous fabric channels, the third group of tiles Tile 8 through Tile 11 is coupled to the third memory interface 1038 using respective asynchronous fabric channels, and the fourth group of tiles Tile 12 through Tile 15 is coupled to the fourth memory interface 1040 using respective asynchronous fabric channels.

In the example of FIG. 10, the memory interfaces are coupled using unidirectional communication channels that provide a communication loop among the interfaces. For example, using the asynchronous fabric, the first memory interface 1034 is configured to communicate information to the second memory interface 1036, the second memory interface 1036 is configured to communicate information to the third memory interface 1038, the third memory interface 1038 is configured to communicate information to the fourth memory interface 1040, and the fourth memory interface 1040 is configured to communicate information to the first memory interface 1034. The memory interfaces can optionally be differently coupled, such as using bidirectional channels of the asynchronous fabric, or can be coupled in other than a loop configuration. Any one or more of the memory interfaces in the example of FIG. 10 can be further coupled with a NOC via a NOC bus or NOC fabric. Connections between the memory interfaces and the NOC are omitted from the illustration for clarity of the other illustrated features.

Figure 11:
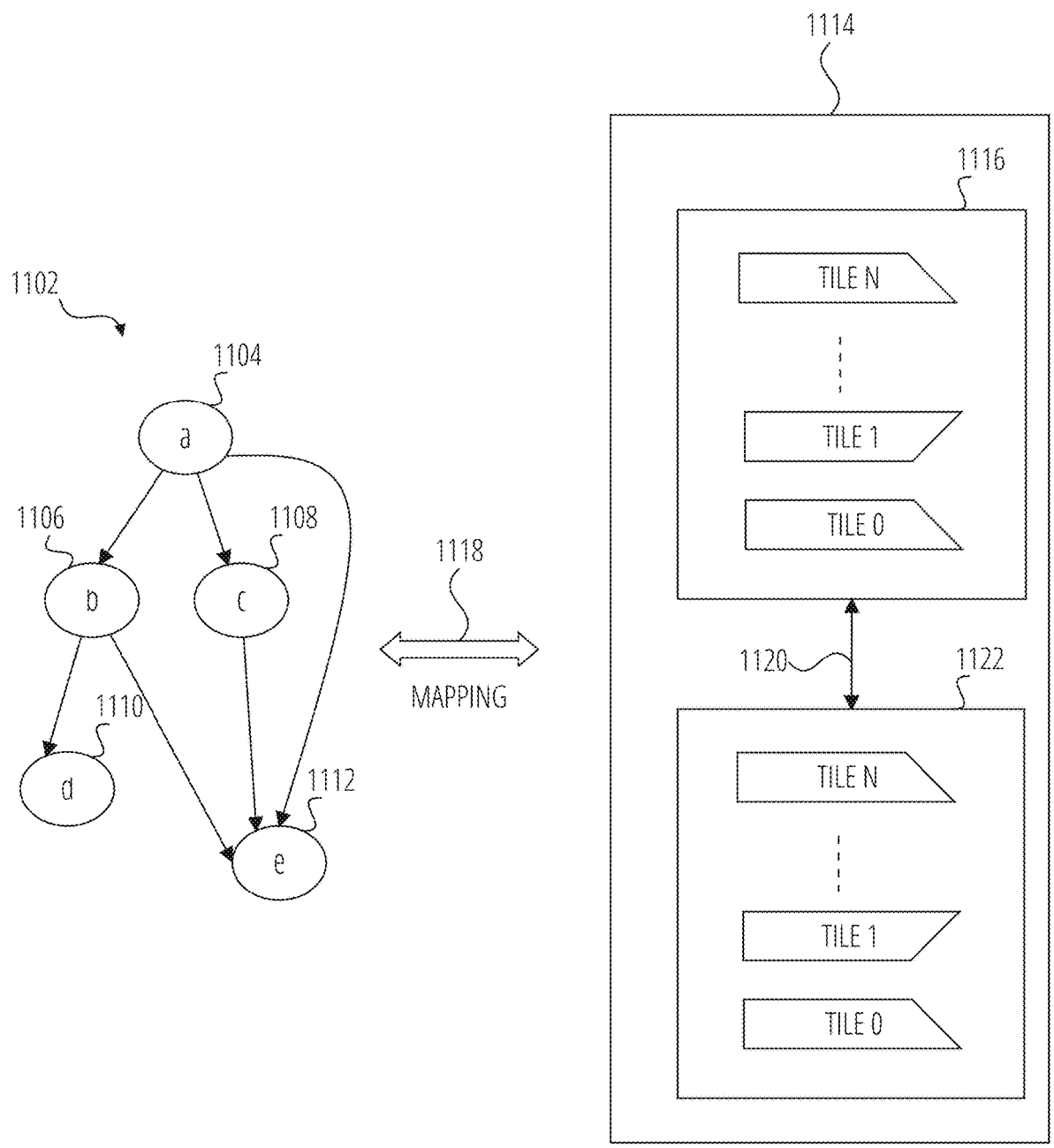
FIG. 11 illustrates generally an example of mapping a kernel graph with various compute resources.

FIG. 11 illustrates generally an example of mapping a kernel graph with various compute resources. The example of FIG. 11 includes a kernel example 1102 represented as a dependency graph or directed graph. The graph includes vertices that represent compute operations or processing elements, and edges that represent connectivity and dependency between the different operations or elements. The example of FIG. 11 further includes a resource group 1114 that represents various functional elements that can perform the operations defined by the kernel example 1102.

In an example, the kernel example 1102 represents a code segment that has been parsed and optionally reconstructed to form a directed acyclic graph. A scheduler can receive the kernel example 1102 and attempt to map the different operations defined by the graph to available compute resources, such as in the HTF 142, such as can comprise a portion of the resource group 1114. That is, the scheduler can perform a kernel graph to resource mapping 1118 to define HTF-level instructions for executing the code represented by the kernel example 1102. The kernel example 1102 includes multiple operations represented by a first vertex 1104, a second vertex 1106, a third vertex 1108, a fourth vertex 1110, and a fifth vertex 1112. The edges between the vertices represent data dependencies. In an example, an operation represented by the fifth vertex 1112 can depend on, and should be timed to coincide with, results from operations corresponding to the second vertex 1106, the third vertex 1108, and the first vertex 1104.

In an example, the kernel graph to resource mapping 1118 includes or uses a modulo scheduling technique whereby loop iterations can be repeated at regular intervals, or initiation intervals (II), with respect to various resource constraints. The kernel graph to resource mapping 1118 can include or use a modulo routing resource graph (MRRG) to represent the resource group 1114, and the MRRG can include a directed graph where graph G={V, E, II}. The graph G models the resources of the target architecture (e.g., corresponding to the HTF) with modulo time corresponding to the initiation interval II, and includes V as the set of nodes that models the ports, functional units, registers, and busses, within each HTF tile, memory interface MI, and dispatch interface DI, and includes E as a representation of an edge set modeling the links between the nodes V, or vertices of the graph. In an example, occupancy of each node in V can be maintained separately for each cycle in the II. In an example, II is measured in clock cycles and represents the initiation interval of pipelines or flows on the HTF.

In an example, the resource group 1114 comprises a first tile system 1116 that includes multiple tile groups or systems, such as a first tile system 1116 and a second tile system 1122. The tile systems can each comprise N (or more, or fewer) tiles configured to execute synchronous flows. The different tile systems can have the same or different number of tiles per system, and tiles within a particular system can be coupled using a synchronous fabric, such as described herein in the examples of FIG. 9 or FIG. 10. In an example, memory interfaces or dispatch interfaces associated with the respective tile systems can be coupled using an asynchronous compute fabric bus 1120 and used to initiate synchronous flows to perform the operations defined by the kernel example 1102.

In an example, the kernel graph to resource mapping 1118 can be configured to map each HTF instruction from the kernel example 1102 to a particular node or resource in the MRRG that represents the HTF. The kernel graph to resource mapping 1118 can be constrained in several ways, including that a candidate node for a particular operation should be capable of executing the particular HTF instruction, an occupancy of the candidate node should not exceed its capacity, and, if the particular operation has multiple input operands, then the mapped paths for the operands in the MRRG should have the same total latency so that arrival times can coincide.

In an example, the kernel graph to resource mapping 1118 comprises an algorithm configured to evaluate different nodes from the MRRG based on a cost function. The cost function can assign a value to different candidate nodes of the MRRG according to their relative impact on, for example, system performance, resource utilization (e.g., at the tile, tile system, or CNM system level), or power consumption, among other factors.

Figure 12:
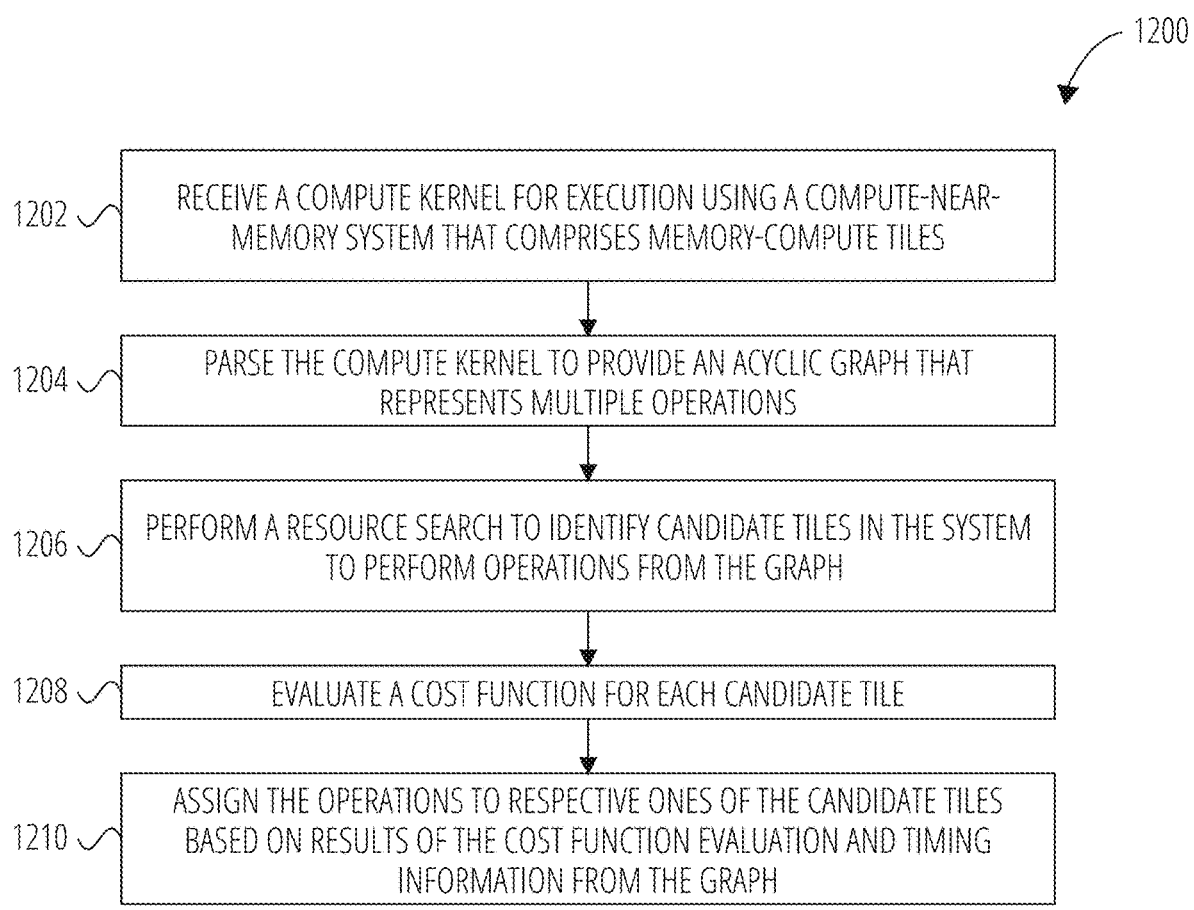
FIG. 12 illustrates generally an example of a resource mapping routine.

FIG. 12 illustrates generally an example of a resource mapping routine 1200. The resource mapping routine 1200 can be performed, for example, using a compiler or scheduler for the CNM system 102, the HTF 142, or the HTF 500. In an example, the resource mapping routine 1200 begins at block 1202 with receiving a compute kernel for execution by or using a the CNM system. The compute kernel can be uncompiled or compiled code that can be implemented using one or more tiles in an HTF. In an example, the compute kernel received at block 1202 can include or comprise the kernel example 1102 from the example of FIG. 11. At block 1204, the received kernel can be parsed to provide an acyclic graph that represents multiple operations that can be performed using one or multiple functional units of one or multiple tiles in the HTF.

At block 1206, the resource mapping routine 1200 can include performing a resource search to identify candidate resources, or tiles, in the CNM system to perform particular operations from the graph. In an example, block 1206 includes preparing a MRRG or other resource graph that represents the different resources or tiles that are available to perform the operations from the graph. In an example, block 1206 includes performing a search algorithm, such as a branch-and-bound search algorithm, to map the kernel graph to resources from the MRRG. The branch-and-bound algorithm can include determining a set of candidate solutions or mappings, such as with various dependencies between the possible solutions, and then evaluating different branches or subsets of the candidate solutions.

At block 1208, the resource mapping routine 1200 can include continuing the resource search by evaluating a cost function for each candidate tile or resource in the MRRG. The various inputs to the cost function are described herein in the discussion of FIG. 13. In an example, a result of the cost function evaluation at block 1208 can include a numerical value representative of one or multiple potential mappings for a particular operation or group of operations. At block 1210, the operations can be assigned to respective different tiles based on the cost function results and timing information from the graph. Following block 1210, the tiles or CNM system can be configured to execute the compute kernel.

In an example, the resource mapping routine 1200 can leverage various HTF features to help find multiple efficient mappings for compute kernels. For example, the enhanced connectivity between or among tiles in the HTF, including the synchronous and asynchronous fabric of the HTF tiles structure, can help provide flexibility as there can be reduced or fewer constraints over which tiles are selected for particular synchronous data flows. That is, the multiple tile inputs and multiple tile outputs, in each of multiple directions, helps provide flexibility for assignment of data flows. In an example, each tile can include multiple tile memories, and each memory can be implemented with fast SRAM that supports single-cycle read and write operations. In an example, these tile memories can provide compiler buffer space for storage of intermediate results or for storing values over many clock cycles.

In an example, portions of the resource mapping routine 1200 can be represented by the following pseudocode [3]:

a particular node MN is capable of performing the particular operation Op, constraint 2 corresponds to occupancy of the particular node MN, and constraint 3 corresponds to a latency characteristic of the particular node MN relative to its position or potential position in a synchronous flow.

```
[3]
Input: Lowered kernel, K; MRRG; Mapping, M; Current operation, Op; Mapped MRRG node,
MN;
Output: Mapping, M
GreedyMap(K, MRRG, M, Op, MN) {
 MapAndStoreResult(Op, MN, M);
   for each unmapped operand, Opr of Op {
     Route = GetRouteForOprinMRRG(Opr, MRRG);
       if !satisfyConstraint_3(Route, Op)
         return FAILED; }
 if isLastOp(Op, K) { print M; return SUCCESS; }
 I = getNextOpToMap(K, Op);
 MI = getClosestOpThatDefinesOprOfNextOp(K, I);
 SMN = getMappedMRRGNode(MI, MRRG);
 PriorityQueue.insert({M.Cost, SMN});
 while (!PriorityQueue.empty( )) {
  C = PriorityQueue.top( ).first;
  MN = PriorityQueue.top( ).second;
  PriorityQueue.pop( );
  for each fanout, FMN of MN {
   if satisfyConstraints_1_2(FMN, I)
    return GreedyMap(K, MRRG, M, I, FMN);
   C = C + evalCostFunc(FMN, I);
   Priority.Queue.insert({C, FMN});
```

In the pseudocode example [3], GreedyMap defines a greedy mapping routine that attempts to generate a mapping M from available resources defined in the MRRG, based on input kernel graph data, such as from a data dependency graph K. The Current operation, Op, is a current node within the graph K that is input into the mapping routine. The mapped node, MN, represents a candidate node to evaluate. In other words, the mapping route receives kernel and resource graph information and uses a search algorithm, such as a breadth-first search algorithm, to evaluate each operation or node in the graph K, assign it to Op, and then try to find a mapped node, MN, where the operation can be mapped or assigned.

In one iteration of the greedy mapping, a pair of nodes can be selected from the Op and MN graphs and stored for further evaluation using the for loop defined in the pseudocode. In the loop, for each operand or input without a mapping, the algorithm searches for a resource in the MRRG that satisfies various requirements such as latency matching, occupancy, capability, or other constraints. If a potential match is found and the requirements are satisfied, then a subsequent or next Op in the graph K can be evaluated. If that next Op fails, then FAILED is returned, and the algorithm can roll back. If, on the other hand, the next Op succeeds, then the algorithm retrieves the next operand. Input arguments can be scanned to identify a closest one in terms of physical distance, and then that Op and argument pair can be used as an anchor to grow a search tree.

Figure 13:
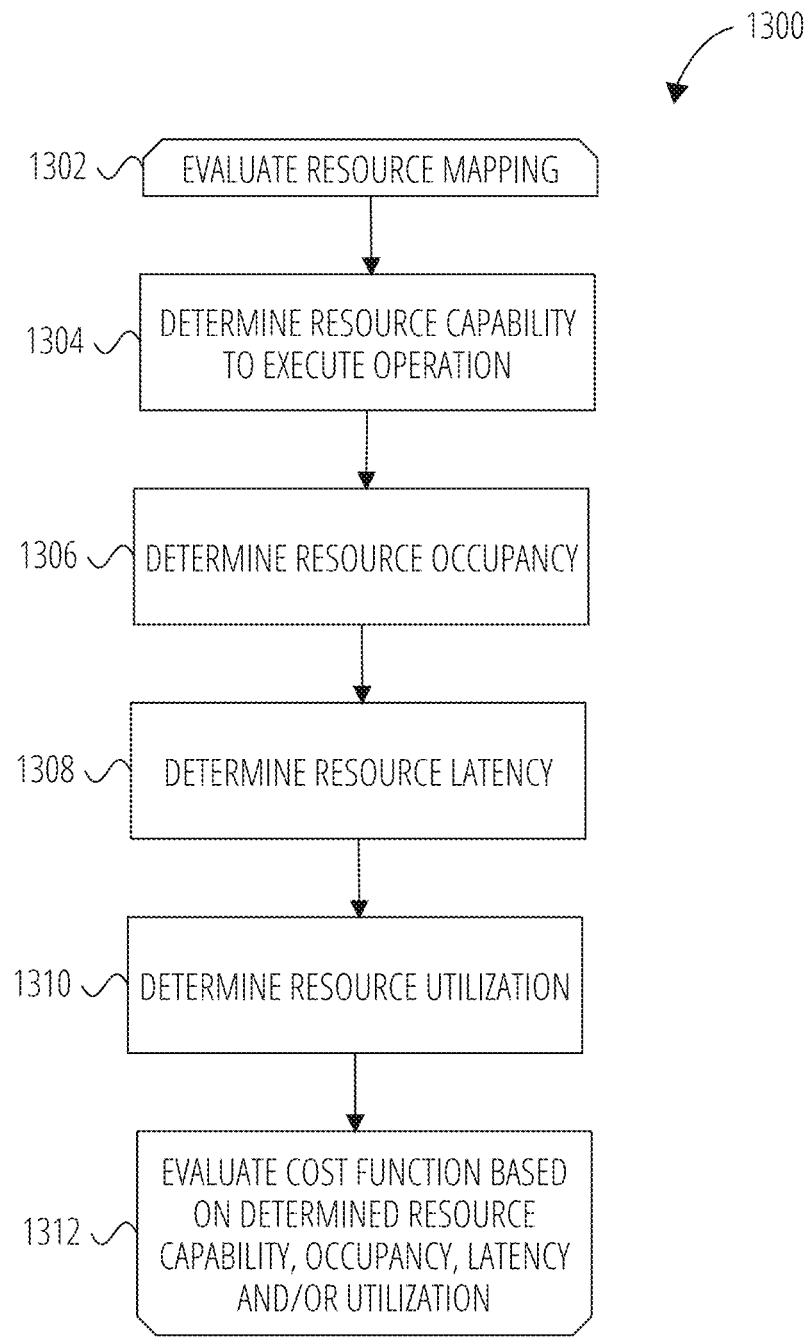
FIG. 13 illustrates generally an example of a cost function determination routine.

In the example of the pseudocode, a function PriorityQueue.insert can be based on a cost function result. If the evaluation queue is not empty, then the function can obtain cost and solution (MN) information and evaluate each fanout, or potential locations to which to map the next operation. A for loop can be used to evaluate the subsequent operations one by one and remove operations that do not satisfy constraints 1 and 2, and then recursively call GreedyMap to map the next instruction I on FMN, the fanout of the node. In this example, constraint 1 corresponds to whether FIG. 13 illustrates generally an example of a cost function determination routine 1300. In an example, the cost function determination routine 1300 can comprise a portion of or correspond to the example of block 1208 from the resource mapping routine 1200.

In an example, the cost function determination routine 1300 can begin at block 1302 with a request to evaluate a candidate resource mapping, such as between a particular compute operation and a particular one of multiple available resources. At block 1304, the cost function determination routine 1300 can include determining a resource capability to execute the particular compute operation. For example, block 1304 can include evaluating whether the resource or HTF tile has appropriate functional units to carry out the operation. At block 1306, the cost function determination routine 1300 can include determining a resource occupancy characteristic for a particular resource. The occupancy characteristic can indicate whether the particular resource is available or unavailable at a particular time slice or Spoke Count within a synchronous flow. At block 1308, the cost function determination routine 1300 can include determining a latency characteristic for a particular resource. The latency characteristic can indicate when a particular resource is or will be available to carry out a particular operation. At block 1310, the cost function determination routine 1300 can include determining a resource utilization characteristic for a particular resource. In an example, block 1310 can include determining whether operations are balanced across a number of tiles within a tile group, within a tile system, or across a CNM system that comprises multiple tile systems. In an example, it can be beneficial to distribute resource utilization throughout available tiles to help reduce heat generation, reduce power consumption, and enhance longevity of the system.

At block 1312, the cost function determination routine 1300 can include evaluating a cost function that is based on one or more of the determined resource capability from block 1304, the determined resource occupancy from block 1306, the determined resource latency from block 1308, or the determined utilization from block 1310. In an example, block 1312 includes providing a numerical result indicative of a cost of assigning a particular operation or group of operations to particular resources in the MRRG so that the compiler or scheduler can make an informed decision about resource allocation.

Figure 14:
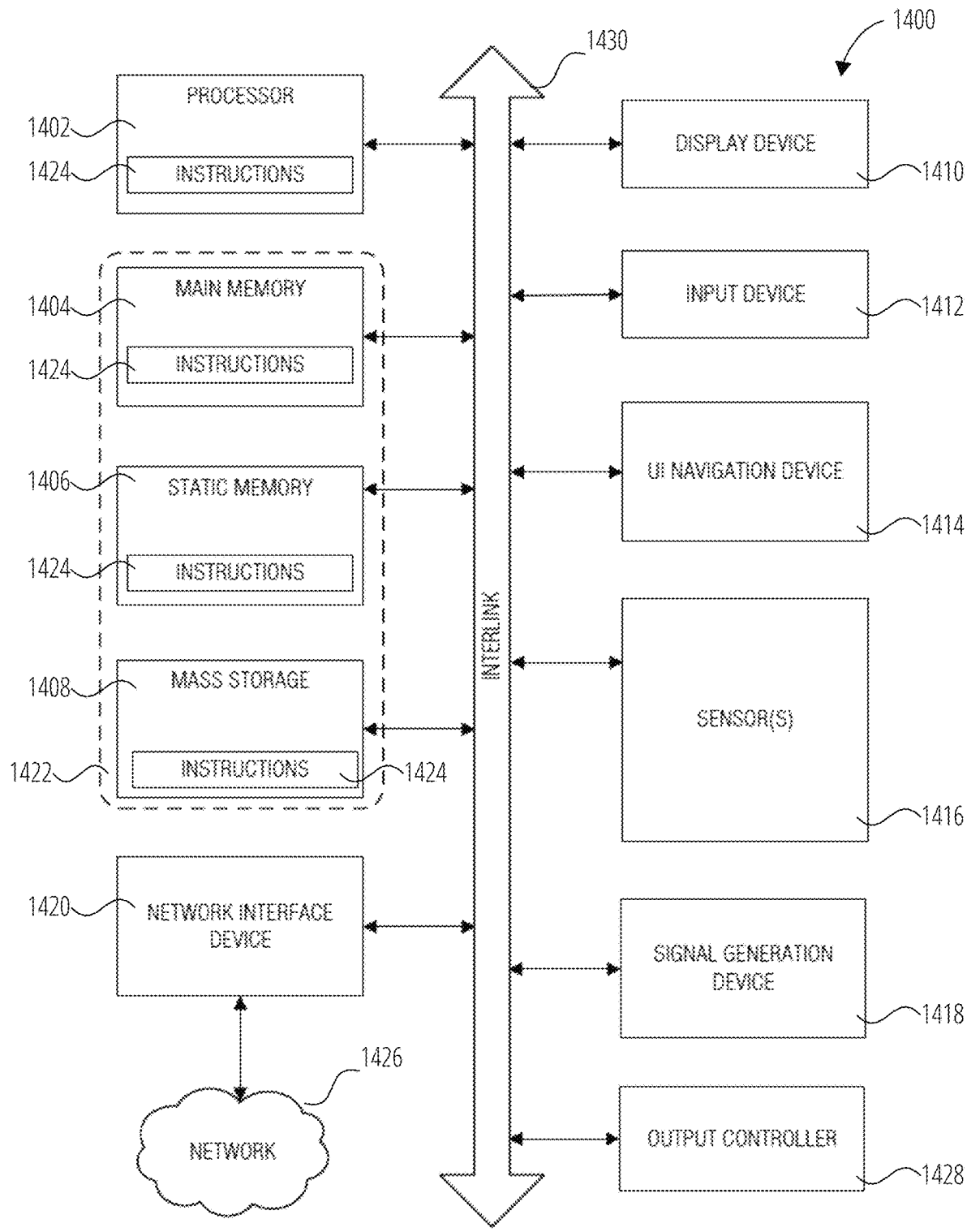
FIG. 14 illustrates a block diagram of an example machine with which, in which, or by which any one or more of the techniques (e.g., methodologies) discussed herein can be implemented.

FIG. 14 illustrates a block diagram of an example machine 1400 with which, in which, or by which any one or more of the techniques (e.g., methodologies) discussed herein can be implemented. Examples, as described herein, can include, or can operate by, logic or a number of components, or mechanisms in the machine 1400. Circuitry (e.g., processing circuitry) is a collection of circuits implemented in tangible entities of the machine 1400 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 1400.

In alternative embodiments, the machine 1400 can operate as a standalone device or can be connected (e.g., networked) to other machines. In a networked deployment, the machine 1400 can operate in the capacity of a server machine, a client machine, or both in server-client network environments. In an example, the machine 1400 can act as a peer machine in peer-to-peer (P2P) (or other distributed) network environment. The machine 1400 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine 1400 (e.g., computer system) can include a hardware processor 1402 (e.g., a central processing unit (CPU), a graphics processing unit (GPU), a hardware processor core, or any combination thereof), a main memory 1404, a static memory 1406 (e.g., memory or storage for firmware, microcode, a basic-input-output (BIOS), unified extensible firmware interface (UEFI), etc.), and mass storage device 1408 (e.g., hard drives, tape drives, flash storage, or other block devices) some or all of which can communicate with each other via an interlink 1430 (e.g., bus). The machine 1400 can further include a display device 1410, an alphanumeric input device 1412 (e.g., a keyboard), and a user interface (UI) Navigation device 1414 (e.g., a mouse). In an example, the display device 1410, the input device 1412, and the UI navigation device 1414 can be a touch screen display. The machine 1400 can additionally include a mass storage device 1408 (e.g., a drive unit), a signal generation device 1418 (e.g., a speaker), a network interface device 1420, and one or more sensor(s) 1416, such as a global positioning system (GPS) sensor, compass, accelerometer, or other sensor. The machine 1400 can include an output controller 1428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the hardware processor 1402, the main memory 1404, the static memory 1406, or the mass storage device 1408 can be, or include, a machine-readable media 1422 on which is stored one or more sets of data structures or instructions 1424 (e.g., software) embodying or used by any one or more of the techniques or functions described herein. The instructions 1424 can also reside, completely or at least partially, within any of registers of the hardware processor 1402, the main memory 1404, the static memory 1406, or the mass storage device 1408 during execution thereof by the machine 1400. In an example, one or any combination of the hardware processor 1402, the main memory 1404, the static memory 1406, or the mass storage device 1408 can constitute the machine-readable media 1422. While the machine-readable media 1422 is illustrated as a single medium, the term "machine-readable medium" can include a single medium or multiple media (e.g., a centralized or distributed database, or associated caches and servers) configured to store the one or more instructions 1424.

The term "machine readable medium" can include any medium that is capable of storing, encoding, or carrying instructions for execution by the machine 1400 and that cause the machine 1400 to perform any one or more of the techniques of the present disclosure, or that is capable of storing, encoding or carrying data structures used by or associated with such instructions. Non-limiting machine-readable medium examples can include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., electrically programmable read-only memory (EPROM), electrically erasable programmable read-only memory (EEPROM)) and flash memory devices; magnetic disks, such as internal hard disks and removable disks; magneto-optical disks; and CD-ROM and DVD-ROM disks.

In an example, information stored or otherwise provided on the machine-readable media 1422 can be representative of the instructions 1424, such as instructions 1424 themselves or a format from which the instructions 1424 can be derived. This format from which the instructions 1424 can be derived can include source code, encoded instructions (e.g., in compressed or encrypted form), packaged instructions (e.g., split into multiple packages), or the like. The information representative of the instructions 1424 in the machine-readable media 1422 can be processed by processing circuitry into the instructions to implement any of the operations discussed herein. For example, deriving the instructions 1424 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 1424.

In an example, the derivation of the instructions 1424 can include assembly, compilation, or interpretation of the information (e.g., by the processing circuitry) to create the instructions 1424 from some intermediate or preprocessed format provided by the machine-readable media 1422. The information, when provided in multiple parts, can be combined, unpacked, and modified to create the instructions 1424. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 1424 can be further transmitted or received over a communications network 1426 using a transmission medium via the network interface device 1420 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1420 can include one or more physical jacks (e.g., Ethernet, coaxial, or phone jacks) or one or more antennas to connect to the network 1426. In an example, the network interface device 1420 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1400, and includes digital or analog communications signals or other intangible medium to facilitate communication of such software. A transmission medium is a machine readable medium.

To better illustrate the methods and apparatuses described herein, a non-limiting set of Example embodiments are set forth below as numerically identified Examples.

Example 1 can include a method comprising receiving a compute kernel for execution using a compute-near-memory system that comprises memory-compute tiles having respective functional units and respective memory circuits, parsing the compute kernel to provide an acyclic graph that represents multiple operations, and performing a resource search to identify candidate tiles in the compute-near-memory system to perform respective ones of the multiple operations using their respective functional units. Example 1 can further include assigning the multiple operations to respective ones of the identified candidate tiles based on results of the resource search and timing information from the acyclic graph. In Example 1, each tile in the compute-near-memory system can be coupled to one or more adjacent tiles using a synchronous compute fabric and can be coupled to one or more non-adjacent tiles using an asynchronous compute fabric, and at least one of the multiple operations can depend on an intermediate compute result communicated between adjacent tiles using the synchronous compute fabric or the asynchronous compute fabric.

Example 2 can include or use features of Example 1, and can further include executing the compute kernel to produce a final compute result, and the final compute result can be determined using functional units corresponding to multiple different tiles and using information exchanged between the multiple different tiles using the synchronous compute fabric.

Example 3 can include or use features of any of the preceding examples, and can further include executing the compute kernel to produce a final compute result, and the final compute result can be determined using functional units corresponding to multiple different tiles and using information exchanged between the multiple different tiles using the asynchronous compute fabric.

Example 4 can include or use features of any of the preceding examples, and can further include executing the compute kernel to produce a final compute result, and the final compute result can be determined using functional units corresponding to multiple different tiles and using information exchanged between the multiple different tiles using the asynchronous compute fabric and using the synchronous compute fabric.

Example 5 can include or use the features of Example 4, and executing the compute kernel can include executing a kernel that includes a nested loop initiated in response to an instruction received via the asynchronous compute fabric.

Example 6 can include or use features of any of the preceding examples, and can further include performing the resource search by performing a branch-and-bound search to map respective ones of the multiple operations to different tiles in a first node of the system.

Example 7 can include or use features of any of the preceding examples, and can further include performing the resource search by evaluating a cost function associated with each of the candidate tiles.

Example 8 can include or use the features of Example 7, and evaluating the cost function can include determining, for each candidate tile, a capability of the candidate tile to perform a particular operation, an occupancy characteristic of the candidate tile, and a latency characteristic of the candidate tile.

Example 9 can include or use features of any of the preceding examples, and can further include, at a first tile of the multiple memory-compute tiles, storing information in a memory that supports single-cycle read and write operations, and the information can include a tile-local compute result or information received via one of the synchronous compute fabric and the asynchronous compute fabric.

Example 10 can include or use features of any of the preceding examples, and can further include parsing the compute kernel by providing an acyclic graph that represents multiple different parallel operations, and assigning the multiple operations to respective ones of the identified candidate tiles can include assigning the parallel operations to respective different tiles for concurrent processing.

Example 11 can include an apparatus comprising a plurality of memory-compute nodes in a compute-near-memory system, wherein the nodes comprise tiles that are coupled using an asynchronous compute fabric and a synchronous compute fabric, and wherein each tile comprises: first synchronous fabric inputs configured to receive information from one or more other tiles in a first node of the compute-near-memory system via the synchronous compute fabric, first synchronous fabric outputs configured to provide information to the same one or more other tiles in the first node, an asynchronous fabric input configured to receive information via the asynchronous compute fabric, an asynchronous fabric output configured to provide information to the asynchronous compute fabric, a functional unit, a first tile-local memory configured to store one of (1) information from one of the first synchronous fabric inputs, (2) result information from the functional unit, and (3) information from the asynchronous fabric input, and a second tile-local memory configured to store another one of the (1) information from one of the first synchronous fabric inputs, (2) result information from the functional unit, and (3) information from the asynchronous fabric input. In Example 10, a compute kernel for execution using the compute-near-memory system can comprise operations performed in parallel using respective ones of the plurality of memory-compute tiles, and intermediate compute results can be communicated between the plurality of memory-compute tiles using at least one of the synchronous compute fabric and the asynchronous compute fabric.

Example 12 can include or use the features of Example 11, and the compute kernel can include latency-matched operations performed using at least respective first and second tiles in the first node.

Example 13 can include or use features of any of the preceding examples, and can further include, a compiler, configured to parse the compute kernel, and configured to generate a synchronous dataflow that depends in part on information from the asynchronous compute fabric.

Example 14 can include or use features of any of the preceding examples, and can further include, first and second tiles of the first node, wherein a functional unit of the first tile can be configured to provide a first compute result based on first information from the asynchronous compute fabric, and a functional unit of the second tile can be configured to provide a second compute result based on the first compute result. In an example, the second tile can be configured to receive the first compute result, from the first tile, via the synchronous compute fabric.

Example 15 can include or use the features of Example 14, and the first and second tiles can be adjacent tiles in the first node, and a third tile, configured to provide the first compute result, can be non-adjacent to the first tile in the first node.

Example 16 can include a non-transitory processor-readable storage medium, the processor-readable storage medium including instructions that when executed by a processor, cause the processor to: receive a compute kernel for execution using a compute-near-memory system that comprises memory-compute tiles having respective functional units and respective memory circuits; parse the compute kernel to provide an acyclic graph that represents multiple operations; perform a resource search to identify candidate tiles in the compute-near-memory system to perform respective ones of the multiple operations using their respective functional units; and assign the multiple operations to respective ones of the identified candidate tiles based on results of the resource search and timing information from the acyclic graph. In Example 16, each tile in the compute-near-memory system can be coupled to one or more adjacent tiles use a synchronous compute fabric and can be coupled to one or more non-adjacent tiles using an asynchronous compute fabric. In an example, at least one of the multiple operations depends on an intermediate compute result communicated between adjacent tiles using the synchronous compute fabric or the asynchronous compute fabric.

Example 17 can include or use the features of Example 16, and the instructions can further configure the processor to execute the compute kernel to produce a final compute result, wherein the final compute result is determined using functional units corresponding to multiple different tiles and using information exchanged between the multiple different tiles using the synchronous compute fabric and using the asynchronous compute fabric.

Example 18 can include or use the features of Example 17, and the instructions to execute the compute kernel can include instructions to configure the processor to execute a kernel that includes a nested loop.

Example 19 can include or use features of any of the preceding examples, and can further include the instructions to perform the resource search as instructions to configure the processor to perform a branch-and-bound search to map respective ones of the multiple operations to different tiles in a first node of the system.

Example 20 can include or use features of any of the preceding examples, and can further include, the instructions to perform the resource search including instructions to evaluate a cost function associated with each of the candidate tiles.

Example 21 can include or use the features of Example 20, and the instructions to evaluate the cost function can include instructions to determine, for each candidate tile, a capability of the candidate tile to perform a particular operation, an occupancy characteristic of the candidate tile, and/or a latency characteristic of the candidate tile.

Example 22 can include or use features of any of the preceding examples, and can further include, the instructions to parse the compute kernel including instructions to provide an acyclic graph that represents multiple different parallel operations, and instructions for assigning the multiple operations to respective ones of the identified candidate tiles can include assigning the parallel operations to respective different tiles for concurrent processing.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An apparatus comprising:
   a plurality of memory-compute nodes in a compute-near-memory system, wherein the nodes comprise tiles that are coupled using an asynchronous compute fabric and a synchronous compute fabric, and wherein each tile comprises:
   first synchronous fabric inputs configured to receive information from one or more other tiles in a first node of the compute-near-memory system via the synchronous compute fabric;
   first synchronous fabric outputs configured to provide information to the same one or more other tiles in the first node;
   an asynchronous fabric input configured to receive information via the asynchronous compute fabric;
   an asynchronous fabric output configured to provide information to the asynchronous compute fabric;
   a functional unit;
   a first tile-local memory configured to store one of (1) information from one of the first synchronous fabric inputs, (2) result information from the functional unit, and (3) information from the asynchronous fabric input; and
   a second tile-local memory configured to store another one of the (1) information from one of the first synchronous fabric inputs, (2) result information from the functional unit, and (3) information from the asynchronous fabric input;
   wherein a compute kernel for execution using the compute-near-memory system comprises operations performed in parallel using respective ones of the plurality of memory-compute tiles, and wherein intermediate compute results are communicated between the plurality of memory-compute tiles using at least one of the synchronous compute fabric and the asynchronous compute fabric.

2. The apparatus of claim 1, wherein the compute kernel comprises latency-matched operations performed using at least respective first and second tiles in the first node.

3. The apparatus of claim 1, wherein a compiler configured to parse the compute kernel is configured to generate a synchronous dataflow that depends in part on information from the asynchronous compute fabric.

4. The apparatus of claim 1, further comprising first and second tiles of the first node,
   wherein a functional unit of the first tile is configured to provide a first compute result based on first information from the asynchronous compute fabric, and
   wherein a functional unit of the second tile is configured to provide a second compute result based on the first compute result.

5. The apparatus of claim 4, wherein the second tile is configured to receive the first compute result, from the first tile, via the synchronous compute fabric.

6. The apparatus of claim 5, wherein the first and second tiles are adjacent tiles in the first node, and wherein a third tile, configured to provide the first compute result, is non-adjacent to the first tile in the first node.

7. The apparatus of claim 1, wherein the compute kernel includes operations comprising a nested loop that is initiated in response to an instruction received via the asynchronous compute fabric.

8. The apparatus of claim 1, wherein at least one tile comprises a passthrough channel comprising a portion of the synchronous fabric and coupling a pair of other, non-adjacent tiles in the first node.

9. An apparatus comprising:
   a plurality of memory-compute nodes in a compute-near-memory system, wherein each of the nodes comprises tiles that are coupled using an asynchronous compute fabric and a synchronous compute fabric, wherein the tiles comprise respective functional units that are configured to perform operations in parallel to provide a final compute result based on a compute kernel;
   wherein the final compute result is based on intermediate compute results determined using the respective functional units corresponding to multiple tiles; and
   wherein the intermediate compute results are communicated between the tiles using at least one of the synchronous compute fabric and the asynchronous compute fabric.

10. The apparatus of claim 9, comprising a non-transitory processor-readable storage medium, the processor-readable storage medium including instructions that, when executed by a processor, cause the processor to:
    receive an acyclic graph that represents multiple operations of the compute kernel;
    perform a resource search to identify candidate tiles to perform respective ones of the multiple operations using their respective functional units; and assign the multiple operations to respective ones of the identified candidate tiles based on results of the resource search and on timing information from the acyclic graph.

11. The apparatus of claim 10, wherein the compute kernel comprises latency-matched operations performed using at least respective first and second tiles in a first node.

12. The apparatus of claim 10, wherein each tile comprises:
first synchronous fabric inputs configured to receive information from one or more other tiles in a first node of the plurality of nodes via the synchronous compute fabric;
first synchronous fabric outputs configured to provide information to the same one or more other tiles in the first node;
an asynchronous fabric input configured to receive information via the asynchronous compute fabric;
an asynchronous fabric output configured to provide information to the asynchronous compute fabric;
a functional unit;
a first tile-local memory configured to store one of (1) information from one of the first synchronous fabric inputs, (2) result information from the functional unit, and (3) information from the asynchronous fabric input; and
a second tile-local memory configured to store another one of the (1) information from one of the first synchronous fabric inputs, (2) result information from the functional unit, and (3) information from the asynchronous fabric input.

* * * * *